(12) United States Patent
Aoki et al.

(10) Patent No.: US 7,249,891 B2
(45) Date of Patent: Jul. 31, 2007

(54) BEARING DEVICE WITH SENSOR AND ROLLING BEARING WITH SENSOR

(75) Inventors: Mamoru Aoki, Kanagawa (JP); Ikunori Sakatani, Kanagawa (JP); Masamitsu Watanabe, Kanagawa (JP)

(73) Assignee: NSK Ltd., Tokyo (JP)

( * ) Notice: Subject to any disclaimer, the term of this patent is extended or adjusted under 35 U.S.C. 154(b) by 128 days.

(21) Appl. No.: 10/532,985

(22) PCT Filed: Oct. 24, 2003

(86) PCT No.: PCT/JP03/13649

§ 371 (c)(1),
(2), (4) Date: Apr. 28, 2005

(87) PCT Pub. No.: WO2004/038426

PCT Pub. Date: May 6, 2004

(65) Prior Publication Data

US 2006/0039639 A1  Feb. 23, 2006

(30) Foreign Application Priority Data

| Oct. 28, 2002 | (JP) | ............................. 2002-312772 |
| Dec. 13, 2002 | (JP) | ............................. 2002-362635 |
| Jan. 7, 2003 | (JP) | ............................. 2003-001159 |
| Jan. 10, 2003 | (JP) | ............................. 2003-004493 |
| Aug. 27, 2003 | (JP) | ............................. 2003-303736 |

(51) Int. Cl.
*F16C 32/00* (2006.01)
*F16C 41/04* (2006.01)

(52) U.S. Cl. .................................................. 384/448

(58) Field of Classification Search ................ 384/448, 384/544; 324/173, 174, 207.25
See application file for complete search history.

(56) References Cited

U.S. PATENT DOCUMENTS

| 5,428,289 A | * | 6/1995 | Sahashi et al. ............. 324/173 |
| 5,873,658 A | * | 2/1999 | Message et al. ............. 384/448 |
| 6,094,046 A | * | 7/2000 | Message et al. ............. 324/173 |
| 6,595,692 B2 | * | 7/2003 | Itou ........................... 384/448 |

FOREIGN PATENT DOCUMENTS

| JP | 8-86797 A | 4/1996 |
| JP | 9-263221 A | 10/1997 |
| JP | 10-311740 A | 11/1998 |
| JP | 2000-142341 A | 5/2000 |
| JP | 2000-225930 A | 8/2000 |
| JP | 2002-139057 A | 5/2002 |
| JP | 2002-213472 A | 7/2002 |

* cited by examiner

*Primary Examiner*—Thomas R. Hannon
(74) *Attorney, Agent, or Firm*—Sughtue Mion, PLLC

(57) ABSTRACT

The present invention relates to a bearing apparatus with a sensor and a rolling bearing with a sensor used to movers such as automobiles or railway carriers, facility machines of equipment, or machine tools. One of the embodiments comprises a sensor detecting conditions of the rolling bearing, a ring-shaped sensor cover housing the sensor therein and secured to a stationary-side bearing ring, and a ring shaped presser member secured to a bearing housing provided outside in a radius direction of the sensor cover, or secured to a shaft, and an opening portion is provided at a decided portion of the sensor cover, and projections standing toward a side of the presser member are furnished in the circumference of the opening portion, the presser member is defined with cutouts for inserting the projections, and the cutouts are arranged with the projections.

3 Claims, 24 Drawing Sheets

BEARING DEVICE WITH SENSOR AND ROLLING BEARING WITH SENSOR

TECHNICAL FIELD

The present invention relates to a bearing apparatus with a sensor and a rolling bearing with a sensor which are used to movers such as automobiles or railway carriers, machines of equipment, or machine tools, and in particular to a bearing apparatus with a sensor (called as "sensor-bearing apparatus" hereafter) and a rolling bearing with a sensor (called as "sensor-rolling bearing" hereafter) which are suited to detecting speed of rotation, direction of rotation, or phases by use of a hole element or hole IC.

BACKGROUND ART

For example, nowadays in automobiles, control of anti-lock breaking system (ABS) or traction control system (TCS) have widely been practiced, and for the control, speed of rotation of wheels must be exactly detected. Therefore, speed of rotation (number of rotation) of a rolling bearing rotatably supporting the wheels with respect to a winding device has been detected.

For detecting speed of rotation (number of rotation) of the rolling bearing, there has much served the sensor-rolling bearing with a rotating sensor installed nearly to the bearing. Namely, the sensor-rolling bearing performs detection of speed of rotation of the wheels in that a cylindrical magnet having many magnetic poles alternately arranged to a rotating side, detects a magnetic flux of the magnet rotating together with the wheels through a sensor using the hole element or the hole IC provided to a stationary side.

The sensor-rolling bearing detects speed of the movers, not limiting to the above mentioned automobiles but including those having the rotating members of such as railway carriers, and the detection of the rotating direction has been also widely practiced. The sensor-rolling bearing has been employed, in many kinds of machines of equipment, for detection of rotation speed of a motor output shaft or that of pump.

In the industrial wide field, for detecting number of rotation of the rotating members, that is, speed of rotation, or for detecting the rotating direction or phases of rotation, the sensor-rolling bearing has widely been used as the bearing of the rotating members.

The conventional sensor-rolling bearing is attached by mounting an outer ring on a bearing housing. Therefore, owing to causes such as difference in thermal expansion, a space between the outer diameter of the outer ring and the inner diameter of the bearing housing exceeds a permissible value, and the outer ring follows rotation of the inner ring and sometimes rotates along the rotating direction of the inner ring.

When the outer ring rotates in response to the rotation of the inner ring, a sensor cover mounted on the outer ring and a sensor housing also rotate concurrently. Then, an input-output signal wire taken out outside from the sensor cover and the sensor housing is effected with shearing force, because it is taken out outside via a cutout groove defined in a presser cover fixed to the bearing housing. Therefore, when the outer ring largely rotates by the rotation of the inner ring, the input-output signal wire might be broken.

Therefore, a bearing 600 with a rotating sensor (called as "rotating sensor-bearing" or "sensor-bearing" hereafter) has been proposed as shown in FIGS. 23 and 24. In the rotating sensor-bearing 600, the sensor housing 606 is provided in an outer diametrical face with whirl-stop members 606a projecting toward a radius direction passing through the sensor cover 607 receiving a rotation sensor 605 therein. The rotating sensor-bearing 600 is arranged with the whirl-stop members 606a in a cutout groove 609a of a presser cover 609, thereby preventing the outer ring 602 from rotating with the rotation of the inner ring 601 (for example, Japanese Patent Laid Open No. 2002-213472).

However, the above mentioned conventional sensor-bearing apparatus 600 is complicated in a structure of securing the whirl-stop members 606a and the sensor cover 607, so that the productivity is low.

A sensor-bearing apparatus 630 has conventionally been known as shown in FIGS. 25 and 26. FIG. 25 is a whole cross sectional view showing the sensor-bearing apparatus, and FIG. 26 is a cross sectional view along C-C line of the sensor-bearing apparatus of FIG. 25. The sensor-bearing apparatus 630 causes one end 641 of the sensor 640 to directly contact a reference face 631a of a stationary-side bearing ring 631, while it causes cut-out faces 633 of a sensor holding element 632 to fix chamfered parts 642 of the sensor 640 in order to position the sensor 640 (for example, Japanese Patent Laid Open No. 311740/1998).

The above mentioned conventional sensor-bearing apparatus 630 has been involved with a problem that a connection output portion 634 or a conductor 635 are applied with external force or vibration, so that a position of the sensor 640 is circumferentially dislocated. Then, an error in output of the sensor 640 is probably caused by the circumferential dislocation.

Therefore, the sensor-bearing apparatus 630 depends on resin insertion between the sensor holding element 632 and the reference face 631a of the stationary-side bearing ring 631 for checking the circumferential dislocation.

However, depending on the resin insertion, since a complicated process is required, there is a room for making improvement with respect to production process and cost-up, accordingly.

FIG. 27 is a cross sectional view of the element parts showing the conventional sensor-rolling bearing. This sensor-rolling bearing 700 is formed by securing a magnetically sensitive sensor 721 and a member 720 to be detected such as a magnet to the outer ring 710 or the inner ring 711.

The magnetically sensitive sensor 721 buried in a sensor carrier 723 includes a beading fixture over a full length of a concave groove 716 formed in an inner diametrical face of the outer ring via a sensor holding device 725. In addition, the member to be detected 720 is disposed on a plane part in the radius direction of an L-shaped member 722 forced in an outer diametrical face, so that the member 720 to be detected faces to the sensor 721.

In the above mentioned conventional sensor-rolling bearing 700, if a size of the bearing is small in the diametrical direction, it is difficult to secure the magnetically sensitive sensor 721 to the inner diametrical face of the outer ring 710 via the sensor carrier 723. It is also difficult to secure the member to be detected 720 to the outer diametrical face 711 of the inner ring via the L-shaped member 722.

For solving this problem, as seeing FIGS. 28 and 29, it may be assumed to provide a step portion in the outer diameter of the outer ring or the inner ring in order to fix the sensor or the member to be detected. But since a face to be processed of the step portion can not be subjected to a centerless machining, sizes are largely dispersed, and it is difficult to force and fix respective members.

In general, the sensor-rolling bearing is very often disposed nearly members generating electric noises by a motor.

Therefore, by disposing locations, an external magnetic field caused by an external noise disturbs a magnetic field formed by the member to be detected, so that such probability might be caused that the sensor cannot exactly detect the magnetic field formed by the member to be detected.

Further, the sensor-bearing apparatus 800 as shown in FIG. 30 is known. FIG. 30 is a cross sectional view of the element parts of the conventional sensor-bearing apparatus. As showing in the same, the sensor-bearing apparatus 800 is structured in that the magnetic sensor 802 of the rotating sensor 801 and a pulsar ring (encoder) 803 are shielded with a sensor case fixing ring 804 of a magnetic substance and a magnetic bypath 805 so as to bypass an external leakage flux (for example, Japanese Patent Laid Open No. 2002-174258).

As another embodiment of the conventional sensor-bearing apparatus 800, there are those shown in FIGS. 31 and 32. FIG. 31 is a whole cross sectional view of the element parts showing another example of the conventional sensor-bearing apparatus 800, and FIG. 32 is an upper (seeing from an upper side of FIG. 31) and partially plan view of FIG. 31.

Referring to FIGS. 31 and 32, in the conventional sensor-bearing 850, the inner ring 852 at the right side of FIG. 31 of the rolling element 853 is secured at the outer circumferential end with a core metal 856 which is arranged with a cylindrical pulsar ring 857 of a permanent magnet. The magnetic sensor 860 is placed within the sensor case 858 leaving a space in relation with the outer circumferential face of the pulsar ring 857, while the sensor case 858 is fixed to an inside of a sensor case fixing ring 861.

In regard to the sensor-bearing 850, the magnetic bypath 862 is furnished to a further inside of the sensor case fixing ring 861 fixed to the outer ring 851 for interrupting the leakage magnetic flux flowing from a coil of the external motor into the magnetic sensor 860. Further, the sensor-bearing 850 is furnished with a side plate 863 and at the same time with a cutout window 861*a* at the upper part of a magnetic sensor 860 in the sensor case fixing ring 861 for interrupting the loop of the leakage magnetic flux into the magnetic sensor 860.

However, the above mentioned conventional sensor-bearing 850 is disposed with the magnetic sensor 860 such as hole elements via the pulsar ring 857 and the space in the radius direction on the outer circumference of the cylindrical pulsar ring (magnet) 857 secured as projecting to the side of the inner ring 852. Therefore, for exactly detecting magnetic change of the rotating pulsar ring 857 by means of the magnetic sensor 860, a surface part of the pulsar ring 857 opposite to the magnetic sensor 860 necessitates a length larger than decided particularly in the axial direction of the sensor-bearing 850.

Accordingly, the surface part of the pulsar ring 857 opposite to the magnetic sensor 860 cannot but project by the length larger than decided in the axial direction of the sensor-bearing 850.

As a result, the above mentioned magnetic sensor 860 has a limitation in shortening the length in the axial direction of the sensor-bearing 850, and cannot satisfy a requirement for saving a space requested for using the sensor-bearing to many kinds of devices, including speed detection of automobiles.

In addition, since the space between the pulsar ring 857 and the magnetic sensor 860 extends in the axial direction, a grease filled in a vacancy of the bearing flows along the space in the axial direction, and is ready for running outside as it is, and therefore, an improvement has been demanded for.

Further, in case the leakage magnetic flux flows owing to an external intense magnetic flux into between the inner ring 852 and the outer ring 853 of the sensor-bearing 850, the magnetic flux leaks to a side of the pulsar ring 857 or the magnetic sensor 860 via the rolling element 853. It is therefore necessary to provide another member of a shielding plate such as a magnetic bypath 862 between the sensor-bearing 850 and the magnetic sensor 860, increasing the number of parts and heightening cost, and concurrently increasing a setting-up process. Besides, an installing space is required to restrain reduction in size.

It is accordingly an object of the invention to provide the sensor-bearing apparatus and the sensor-rolling bearing, which may bring about high productivity and cost saving effect, position the sensor easily and at high precision without requiring the complicated process as the formation of resin insertion, effectively bypass the leakage magnetic flux from the outside with the less number of parts in order to avoid erroneous action of the sensor caused by electric noises of the motor, secure the requisite and enough whirl-stopping efficiency of the stationary-side bearing ring, and reduce in size by shortening the length in the axial direction.

DISCLOSURE OF INVENTION

The above mentioned object of the invention can be accomplished by means of the under mentioned structures.

(1) A bearing apparatus with a sensor, furnished with a rolling bearing including in that a plurality of rolling elements are incorporated between a rotary-side bearing ring and a stationary-side bearing ring, a sensor enabling to detect conditions of the rolling bearing, a ring shaped sensor cover housing the sensor inward and secured to the stationary-side bearing ring, and a ring shaped presser member secured to a bearing housing or a shaft provided outside in a radius direction of the sensor cover, wherein an opening is defined in a determined position of the sensor cover, and is provided at its peripheral part with projections standing toward the side of the presser member, the presser member is formed with a cutout into which the projections are inserted for restraining rotation of the sensor cover.

(2) The bearing apparatus with a sensor as set forth in the above (1), wherein a signal wire to be connected to the sensor is inserted in the opening.

(3) The bearing apparatus with a sensor as set forth in the above (1) or (2), wherein the projections are made by being bent to project a slash formed in one part of the sensor cover in a diametrical direction.

(4) In a rolling bearing structured in that a plurality of rolling elements held in a holder are rotatably incorporated between a pair of bearing rings, a bearing apparatus with a sensor, comprising a sensor for detecting conditions of a supported rotating shaft or of the rolling bearing, a ring shaped sensor cover secured to one end face in an axial direction of a stationary-side bearing ring, and a ring shaped sensor holding member secured to the sensor cover, wherein the sensor is fitted in a sensor holding groove provided in a determined position along a circumferential direction in the sensor holding member with a determined tightening margin owing to elastic deformation of the sensor holding member.

(5) The bearing apparatus with a sensor as set forth in the above (4), wherein the sensor holding member is fitted inward of the sensor cover with a determined space.

(6) The bearing apparatus with a sensor as set forth in the above (4) or (5), wherein the sensor holding member is formed with a plurality of positioning pins as projecting respectively in the axial direction, leaving determined spaces in the circumferential direction, and the sensor cover is formed with a plurality of fitting holes in respective positions corresponding to the plurality of positioning pins, and the plurality of positioning pins are fitted in the plurality of respectively corresponding fitting holes, whereby the sensor cover and the sensor holding member are positioned.

(7) The bearing apparatus with a sensor as set forth in the above (6), wherein the plurality of positioning pins are respectively inserted in the plurality of fitting holes, and the plurality of positioning pins passing through the plurality of fitting holes are plastic-deformed at front ends, whereby the sensor cover and the sensor holding member are fixed.

(8) The bearing apparatus with a sensor as set forth in the above (6) or (7), wherein the plurality of fitting holes are formed in the circumference with projections standing toward the sensor holding member, and the sensor cover and the sensor holding member are engaged by means of the projections only.

(9) The bearing apparatus with a sensor as set forth in anyone of the above (6) to (8), wherein a circuit substrate of the sensor is held between the sensor cover and the sensor holding member, and the plurality of positioning pins of the sensor holding member pass through holes provided in the corresponding positions in the circuit substrate, and are inserted in the fitting holes.

(10) In a rolling bearing structured in that a plurality of rolling elements held in a holder are rotatably incorporated between a pair of bearing rings, a bearing apparatus with a sensor, comprising a sensor for detecting conditions of a supported rotating shaft or of a bearing, a ring shaped sensor cover of a magnetic material secured to one end face in an axial direction of a stationary-side bearing ring, a ring shaped sensor holding member of a non-magnetic material holding the sensor inward under a condition of being secured inward of the sensor cover, and a conductive member installed as covering at least one part of the sensor holding member and has an electromagnetic shield effect.

(11) In a rolling bearing structured in that a plurality of rolling elements held in a holder are rotatably incorporated between a pair of bearing rings, a bearing apparatus with a sensor, comprising a sensor for detecting conditions of a supported rotating shaft or of a bearing, a ring shaped sensor cover of a conductive member having an electromagnetic shielding effect secured to one end face in an axial direction of a stationary-side bearing ring, and a ring shaped sensor holding member of a non-magnetic material holding the sensor inward under a condition of being secured inward of the sensor cover.

(12) The bearing apparatus with a sensor or the rolling bearing with a sensor as set forth in the above (10) or (11), wherein the conductive member is provided as one body with the sensor holding member.

(13) A rolling bearing with a sensor, comprising an inner ring, an outer ring, rolling elements interposed between the inner ring and the outer ring, a magnetic part to be detected provided to one of the inner ring and the outer ring, and a magnetically sensitive sensor provided to the other of the inner ring and the outer ring and being opposite to the magnetic part to be detected, wherein any one of the magnetic part to be detected and the magnetically sensitive sensor is secured to the inner ring or the outer ring via an attaching member of a magnetic substance.

(14) The rolling bearing with a sensor as set forth in the above (13), wherein the magnetic part to be detected is a ring shaped multi-pole magnet of rare earth.

(15) The rolling bearing with a sensor as set forth in the above (13) or (14), wherein the attaching member is fixedly caulked in a concave groove formed in an outer diameter of the inner ring or the outer diameter of the outer ring.

(16) The rolling bearing with a sensor as set forth in the above (15), wherein the concave groove is formed in the circumference along the outer diameter of the inner ring or the outer diameter of the outer ring, and the attaching members are caulked in a plurality of positions equidistantly along the circumference.

(17) The rolling bearing with a sensor as set forth in the above (16), wherein the number of the caulking positions follows the under mentioned formula, (the number of the caulking positions)=$nZ \pm X$ herein,
n: positive integer
Z: the number of the rolling elements, and
X: integer of 2 or more

(18) The rolling bearing with a sensor as set forth in the above (17), wherein the number of the caulking positions is prime.

(19) In a rolling bearing having at least an outer ring, an inner ring, and rolling elements, any one of the outer ring and the inner ring is a rotating ring, while the other is a stationary ring, a rolling bearing with a sensor, wherein an end face of a flat magnet is multi-pole magnet, and is secured to the rotating ring, and a magnetically sensitive element is secured to the stationary ring in opposition to the flat multi-pole magnetic face, leaving spaces equidistantly in an axial direction of the bearing.

(20) The rolling bearing with a sensor as set forth in the above (14) or (19), wherein the member of attaching the magnet to the rotating ring extends toward the stationary ring so as to close a vacancy of the bearing between the rotating ring and the stationary ring.

(21) The rolling bearing with a sensor as set forth in the above (20), wherein the inner ring is the rotating ring, and the magnet attaching member is secured to a step portion in the inner circumference of the inner ring.

In accordance with the sensor-bearing apparatus mentioned in the above (1), if the projection provided in the sensor cover contacts the interior of the cutout of the presser member while the rolling bearing rotates, the movement in the rotating direction is checked. Then, in company with the rotation of rotary-side bearing ring of the rolling bearing, the rotation of the sensor cover and the rotary-side bearing ring integral with the sensor cover can be checked. Accordingly, by the above sensor-bearing apparatus, even if the stationary-side bearing ring of the rolling bearing is generated with the rotating force, it is possible to exactly check the rotation of the stationary-side bearing ring, and the productivity is not reduced because the structure is simple.

In accordance with the sensor-bearing apparatus mentioned in the above (2), the signal wire of the sensor inserted in the opening of the sensor cover is not effected with the shearing force by contacting the interior of the cutout, and the signal wire is exactly avoided from breaking of the wire. If the structure is to fix the signal wire inserted in the projection by adhesion, welding, or a resin molding, a drawing strength of the signal wire can be heightened, and the wire can be avoided from breaking when a tensile load is increased.

In accordance with the sensor-bearing apparatus mentioned in the above (3), it is possible to curtail the number of parts, the setting-up process, and lower costs.

In accordance with the sensor-bearing apparatus mentioned in the above (4), the sensor is secured in the sensor attaching groove formed in the sensor holder in that the tightening margin is effected with an elastic deformation of the sensor holder. Therefore, neither insertion of the resin nor use of an adhesive are requisite, and accordingly, the positioning is realized easily and at high precision.

In accordance with the sensor-bearing apparatus mentioned in the above (5), it is possible to avoid the sensor cover from deformation caused by expansion and shrinkage of the sensor holder owing to temperature change, so that it is possible to avoid dropping of the sensor cover from the stationary-side bearing ring (for example, the outer ring) or deformation of the stationary-side bearing ring.

In accordance with the sensor-bearing apparatus mentioned in the above (6), when inserting the respective positioning pins in the respectively corresponding fitting holes, the sensor cover and the sensor holder can be positioned at high precision without requiring the complicated process such as the resin inserting formation.

In accordance with the sensor-bearing apparatus mentioned in the above (7), the positioning pins can be prevented from dropping from the fitting holes, depending on plastic-deformed parts. Accordingly, the above mentioned sensor-bearing apparatus can exactly prevent the sensor from dropping or dislocation even if applying the external force as vibration.

Herein, as actual examples of the plastic deformation, there are listed thermal deformation by heating, laser deposit, or supersonic welding.

In accordance with the sensor-bearing apparatus mentioned in the above (8), the holding pressure is kept high around the circumferences of the respective fitting holes, and the function of the positioning pin is heightened.

In accordance with the sensor-bearing apparatus mentioned in the above (9), the sensor cover and the sensor holder are positioned, and at the same time, the positioning pins are passed into the through-holes formed in the circuit substrate, so that the circuit substrate is positioned and supported at high precision between the sensor cover and the sensor holder.

This is such a structure where the sensor cover and the sensor holder or the circuit substrate are engaged only at the projection of the circumferential part of the fitting hole. Therefore, it is possible to limit the part of mutually contacting the circuit substrate and the sensor cover to, e.g., another part than a circuit of the circuit substrate. Thus, a short circuit by contact between the circuit of the circuit substrate and the sensor cover can be avoided certainly.

In accordance with the sensor-bearing apparatus mentioned in the above (10), the sensor is shielded from electromagnet by a conductive member having an electromagnetic shielding effect, which is provided so as to cover at least one part of the sensor holding member. Therefore, the flow of the leakage magnetic flux from the outside is effectively bypassed (detour) by the electromagnetic shield depending on the conductive member.

Further, the sensor-bearing apparatus according to the invention does not necessitate the sensor case fixing ring 804 or 861, the magnetic by-path 805, or the side plate 863 as the sensor-bearing apparatus 800 or the sensor-rolling bearing 850 shown in FIGS. 30 and 31.

Accordingly, the number of parts may be curtailed, and the setting-up process may be reduced.

In accordance with the sensor-bearing apparatus mentioned in the above (11), the sensor cover includes the conductive member having the electromagnetic shielding effect. Therefore, the flow of the leakage magnetic flux from the outside is effectively bypassed (detour) by the electromagnetic shield depending on the conductive member. In addition, the number of parts may be further curtailed, and the setting-up process may be reduced.

In accordance with the sensor-bearing apparatus and the sensor-rolling bearing mentioned in the above (12), the conductive member may be provided to the sensor holder at higher strength, and concurrently the number of parts may be further curtailed, and the setting-up process may be reduced.

As a method of integrally forming the conductive member and the sensor holder, there are a 2-color molding of a conductive resin, adhesion or pressing into fixture. The conductive member includes iron powder, magnetic powder, resin or rubber mixed with carbon black, paint or adhesive.

In accordance with the sensor-rolling bearing mentioned in the above (13), the attaching member being the magnetic substance functions as the magnetic shield to the external magnetic field, and reduces influences of the external magnetic field to the magnetic part to be detected and to the magnet sensitive sensor. Therefore, it is possible to heighten the detecting precision of the magnet sensitive sensor, and perform the exact measure.

In accordance with the sensor-rolling bearing mentioned in the above (14), being exposed to an intensively magnetic environment, the capacity in the magnetic part to be detected is not spoiled, and the speed of rotation can be exactly detected. By the way, the magnetic materials of the rare earth may list neodymium-iron-boron (Nd—Fe—B), or samarium-cobalt (Sm—Co), and the forming method may depend on any of sintering, compression molding, or injection molding, but desirably neodymium, iron, or boron materials are good because of being large in a maximum energy storage and durable to the external magnetic field, and among them a bond magnet is better because of having excellent strength. Of the bond magnets, desirable are such magnetic materials of the large energy storage and by the compression molding.

In accordance with the sensor-rolling bearing mentioned in the above (15), it is unnecessary to provide such as the step portion difficult to pass the precise process, and possible to accurately furnish the magnetically sensitive sensor and the member to be detected in the inner ring and the outer ring.

In accordance with the sensor-rolling bearing mentioned in the above (16), the accuracy of attaching the sensor by means of the attaching members can be improved.

In accordance with the sensor-rolling bearing mentioned in the above (17) or (18), abnormal noises or vibrations probably generated in the bearing may be reduced.

In accordance with the sensor-rolling bearing mentioned in the above (19), since the magnetically sensitive elements are arranged in opposition one another, leaving spaces in the axial direction in the bearing by using the magnets having multi-poles in plane, thickness in the axial direction of the whole of the sensor-bearing.

In accordance with the sensor-rolling bearing mentioned in the above (20), even in case the seal is not especially equipped in the bearing space between the rotary rings, the grease in the bearing space can be prevented from flowing out outside from the bearing. Further, by making the magnet attaching member of a magnetic member, if an intensively magnetic field generating part exists around the environment, the leakage magnetic flux from the rolling elements can be avoided from going toward the magnetically sensitive elements such as the magnet or the hole IC. As a result, there is no miss-count of the speed pulse owing to erroneous action of the magnetically sensitive element, so that the pulse measuring accuracy can be heightened. Besides, since the magnet attaching member can be used as the shielding member of the magnetic flux, other parts are unnecessary, enabling to cost down.

In accordance with the sensor-rolling bearing mentioned in the above (21), the seal used in the existing bearing can be served as it is, and the runoff of the grease can be reduced to the standard bearing.

BEST MODE FOR CARRYING OUT THE INVENTION

The following description will explain in detail embodiments of the sensor-bearing apparatus and sensor-rolling bearing with reference to the attached drawings. By the way, the sensor-bearing apparatus and the sensor-rolling bearing according to the invention are not limited to these embodiments.

FIRST EMBODIMENT

Figure 1:
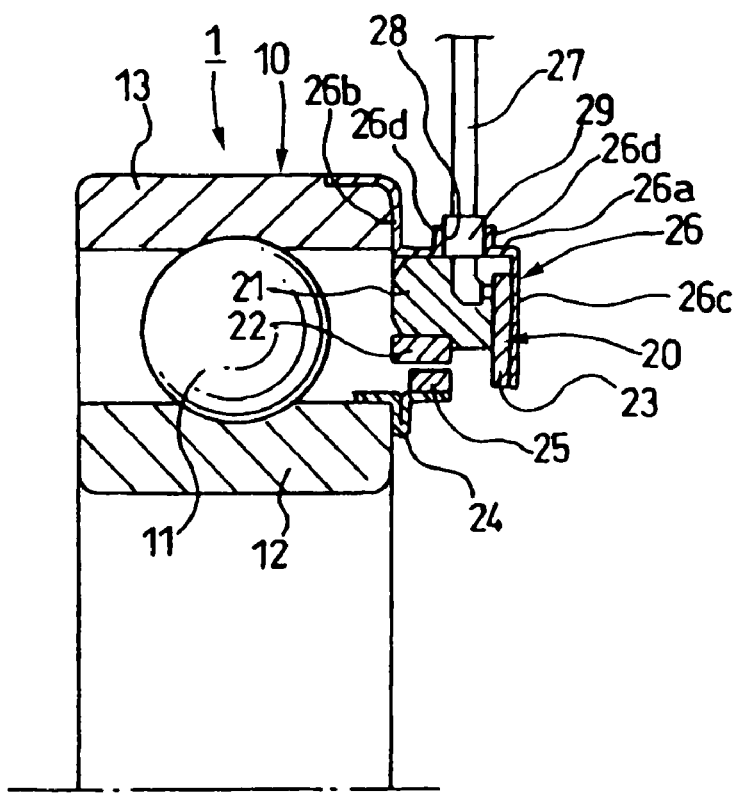
FIG. 1 is a cross sectional view of the element parts, showing the sensor-bearing apparatus as a first embodiment of the invention.
Figure 2:
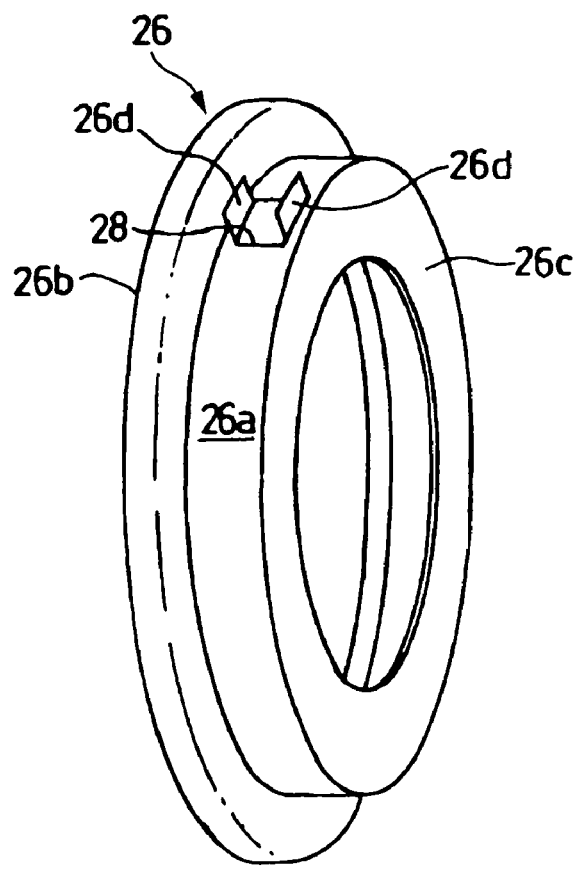
FIG. 2 is a perspective view showing the sensor cover of the sensor-bearing apparatus of FIG. 1.
Figure 3:
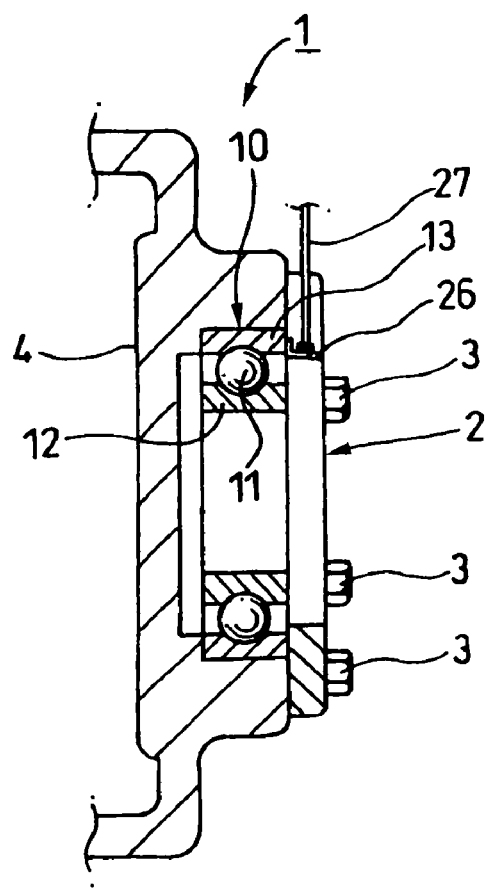
FIG. 3 is a cross sectional view showing the element parts secured to the bearing housing of the sensor-bearing apparatus of FIG. 1.
Figure 4:
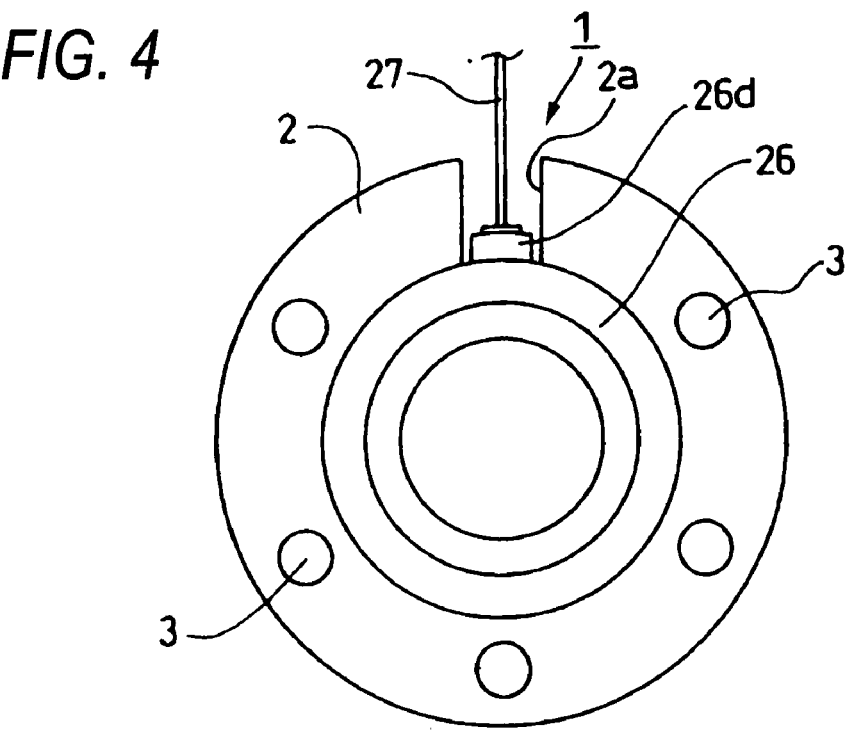
FIG. 4 is a right side view of FIG. 3.
Figure 5:
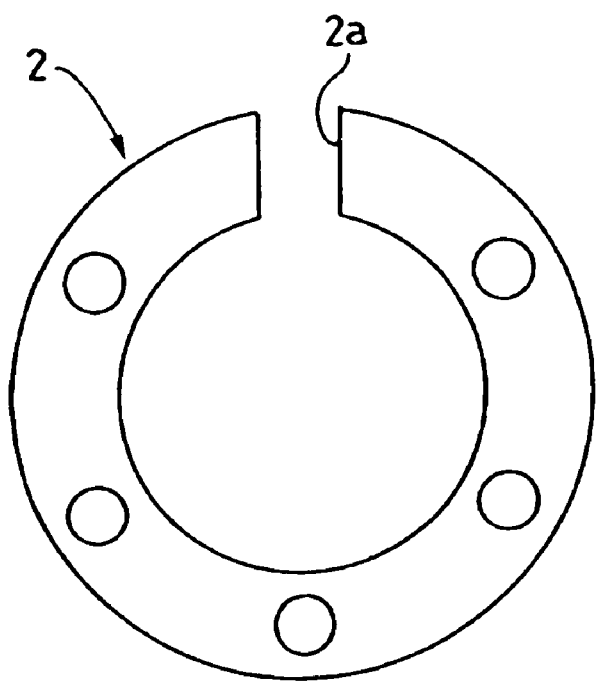
FIG. 5 is a view showing the presser member of the sensor-bearing apparatus of FIG. 3.

FIG. 1 is the cross sectional view of the element parts, showing the first embodiment of the sensor-bearing apparatus depending on the invention. FIG. 2 is the perspective view showing the sensor cover of the sensor-bearing apparatus of FIG. 1. FIG. 3 is the cross sectional view of the element parts showing the sensor-bearing apparatus having the rolling bearing of FIG. 1 secured to the bearing housing. FIG. 4 is a right side view of FIG. 3. FIG. 5 is a view showing the presser member of the sensor-bearing apparatus of FIG. 3.

As showing in FIG. 1, the sensor-bearing apparatus 1 is furnished with the rolling bearing 10. The rolling bearing 10 has the inner ring 12 as the rotary-side bearing ring, the outer ring 13 as the stationary-side bearing ring, and a plurality of rolling elements 11 rotatably interposed between the inner ring 12 and the outer ring 13. The plural rolling elements 11 are held by a holder (not shown) to be equidistant in a circumferential direction.

The sensor-bearing apparatus 1 has the sensor 20 enabling to detect conditions of the rolling bearing 10.

The sensor 20 has the sensor holder 21, a sensor body 22 supported by the sensor holder 21, the circuit substrate 23, a multi-polar magnet (encoder) 25 secured in the inner ring (the bearing ring at the movable side) though a bracket 24, and the sensor cover 26.

The multi-polar magnet 25 rotates together with the inner ring 12. The sensor body 22 comprises a hole IC for detecting position, enabling to detect movement in rotating direction of the multi-polar magnet 25 and a hole IC for detecting the rotation speed. In the circuit substrate 23, an electronic circuit is mounted for processing detected signals by the sensor body 22.

As showing in FIGS. 1 and 2, the sensor cover 26 is formed by a sheet metal working, and includes a ring shaped part 26a receiving the sensor inward, a flange part 26b provided at one end side in the axial direction (a left side of FIG. 2), and a side face part 26c provided at the other end side in the axial direction (a right side of FIG. 2).

The sensor cover 26 is fixed by forcing to fit the flange part 26b on the outer circumference of the outer ring 13 of the rolling bearing 10.

In a determined position in the ring shaped part 26a of the sensor cover 26, an opening 28 is defined. The opening 28 is provided at its peripheral parts with a pair of projections 26d standing in a diametrical direction, which are respectively made by being bent to diametrically project a slash formed in one part of the ring shaped part 26a of the sensor cover 26. In the instant embodiment, the pair of projections are bent as double-leafed hinged doors.

The circuit substrate 23 is closely attached to an inside (the side of the rolling bearing 10) of a side face 26c of the sensor cover 26. In the opening 28, an input-output signal wire 27 connected to the circuit substrate 23 passes.

As showing in FIG. 3, in the sensor-bearing apparatus 1, the rolling bearing 10 is attached to the bearing housing 4 by means of the presser member 2 and bolts 3. The sensor 20 is positioned at one end face side in the axial direction (right end face side in FIG. 3) in the rolling bearing 10.

As showing in FIGS. 4 and 5, the presser member 2 is shaped in ring, and formed with a portion cut out (called as "cutout" hereafter) having a space in a circumferential direction. The cutout 2a is formed such that the width in, the circumferential direction is slightly larger than the width in the circumferential direction of the projection 26d.

The sensor-bearing apparatus 1 is structured such that the pair of projections 26d of the sensor cover 26 are positioned inside of the cutout 2a of the presser member 2. Therefore, with respect to the sensor-bearing apparatus 1, the outer ring 13 of the rolling bearing 10 is secured to the bearing housing 4 without interfering with the input-output signal wire 27.

Further, if one of circumferential edges of the projections 26d contacts an inner wall of the cutout 2a, the sensor cover 26 is held by the presser member 2 as being impossible to rotate. In other words, the sensor cover 26 is checked from rotating together with rotation of the inner ring 12 as the rotary-side bearing ring, whereby the outer ring 13 secured with this sensor cover 26 is similarly checked from rotation.

It is also sufficient that the signal wire fixing resin 29 is filled between the mutual projections 26d, so that the input-output signal wire 27 of the sensor 20 inserted in the opening 28 is fixed to the sensor cover 26 by means of the signal wire fixing resin 29. Thereby, the drawing strength of the input-output signal wire 27 from the sensor cover 26 is heightened, and the breaking of wire can be exactly avoided even if a tensile load is effected to the input-output signal wire 27.

A structure of fixing the input-output signal wire 27 to the projections 27 may depend on adhesion or welding, not depending on the above mentioned resin mold. Besides, such structures are also enough which fit the input-output signal wire 27 in the projections 26d, or which plastic-deform the projections 26d to keep the input-output signal wire 27 therebetween.

According to the sensor-bearing apparatus 1 of the present embodiment, while the rolling bearing 10 rotates, the projections 26d provided in the sensor cover 26 contact the inside of the cutout 2a of the presser member 2, thereby to check the movement in the rotating direction. Then, in company with the rotation of the inner ring 12 as the rotary-side bearing ring of the rolling bearing 10, the sensor cover 26 and the outer ring (the stationary-side bearing ring) 13 as one body of this sensor cover 26 are checked from rotation. Therefore, depending on the above mentioned sensor-bearing apparatus 1, if the rotating force is generated in the outer ring 13 of the rolling bearing 10, the rotation of the outer ring 13 can be certainly stopped.

Accordingly, the input-output signal wire 27 of the sensor 20 inserted in the opening 28 of the sensor cover 26 is never acted with shearing force or tensile load, whereby breaking of the wire of the input-output signal wire 27 is certainly avoided, and reliability or life of the sensor 20 are increased.

Further, since the rotation of the outer ring 13 can be checked, a creeping phenomenon of the outer ring 13, and the reliability or life of the rolling bearing 10 are heightened.

With the structure of the projections 26d as mentioned above, neither extra groove nor cutout are necessary for checking the rotation of the outer ring 13, so that rigidity of the rolling bearing 10 can be avoided from declining. In addition, a new whirl-stop member covering the input-output signal wire is not installed, and the number of production process can be lessened.

In the following descriptions, modifications in shapes of the projections will be explained referring to the second embodiment to the fourth embodiment.

SECOND EMBODIMENT

Figure 6:
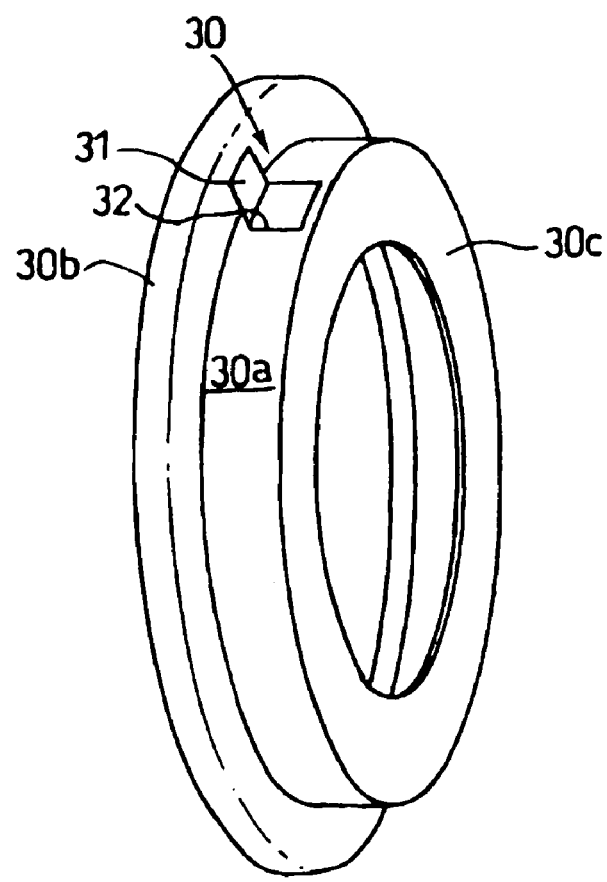
FIG. 6 is a perspective view showing the sensor cover of the sensor-bearing apparatus as a second embodiment of the invention.

FIG. 6 is the perspective view for explaining the second embodiment of the sensor-bearing apparatus according to the invention. Incidentally, in the embodiments to be explained under, as to members having equivalent structures or works to those of the members already referred to, explanations will be simplified or omitted by giving the same or corresponding numerals or marks.

In this embodiment, the projection 31 of the sensor cover 30 is structured to be a single-leafed hinged door by so bending a cutout part formed in a part of the sensor cover 30 as to project in the diameter direction.

Other structures and works are the same as those of the first embodiment.

THIRD EMBODIMENT

Figure 7:
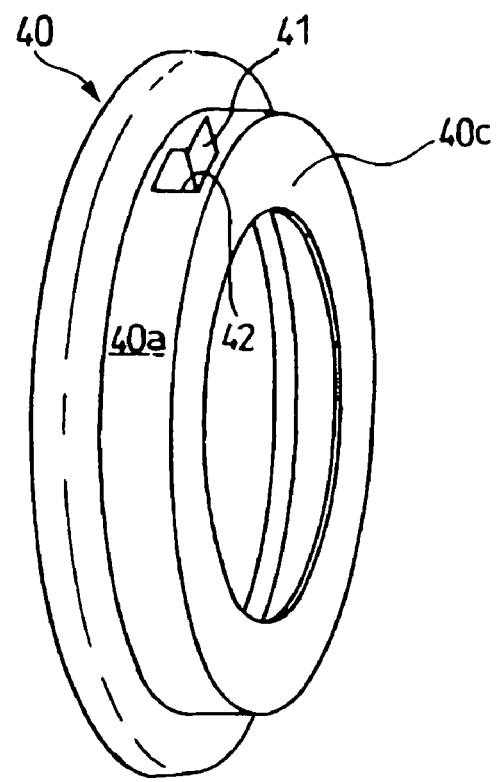
FIG. 7 is a perspective view showing the sensor cover of the sensor-bearing apparatus as a third embodiment of the invention.

FIG. 7 is the perspective view showing the sensor cover of the rolling bearing of the sensor-bearing apparatus as the third embodiment of the invention.

In this embodiment, the projection 41 of the sensor cover 40 is structured to be a single-leafed hinged door by so bending the cutout part formed in a part of the sensor cover 40 as to project in the diameter direction, in opposition to the second embodiment in the axial direction (the side face 40c).

Other structures and works are the same as those of the first embodiment.

FOURTH EMBODIMENT

Figure 8:
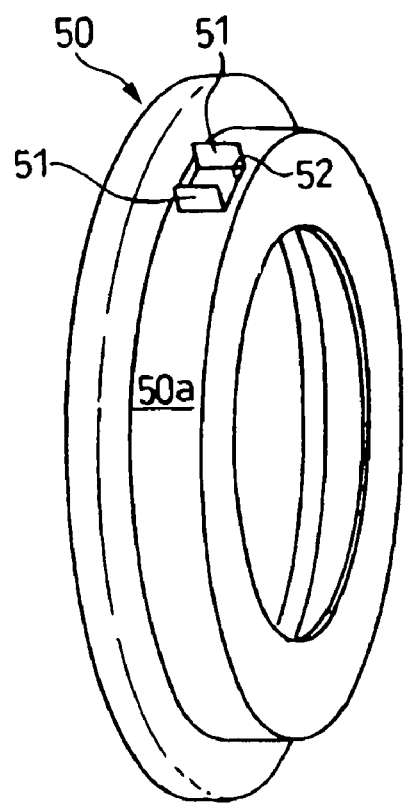
FIG. 8 is a perspective view showing the sensor cover of the sensor-bearing apparatus as a fourth embodiment of the invention.

FIG. 8 is the perspective view showing the sensor cover of the rolling bearing of the sensor-bearing apparatus as the fourth embodiment of the invention.

In this embodiment, the sensor cover 50 is provided with a pair of projections 51 by bending the cutout slashed in a part of the sensor cover 51 in the circumferential direction in a manner of the double-leafed hinged doors.

Other structures and works are the same as those of the first embodiment to the third embodiment.

By the way, also in this embodiment, similarly to the second embodiment or the third embodiment, the projection may be structured as the single-leafed hinged door in the circumferential direction of the sensor cover.

As mentioned above, in the second to fourth embodiments, the sensor covers 30, 40, 50 are structured in that the projections 31, 41, 51 standing on the ring parts 30a, 40a, 50a are disposed inside of the cutout 2a of the presser member 2 shown in FIGS. 4 and 5. In such manners, the projections 31, 41, 51 are held by the presser member 2 to disable to rotate, and even if the rotating force of the outer ring 13 acts on, the outer ring 13 and the sensor cover 26 can be checked from rotation accompanied with the rotation of the inner ring 12.

Figure 23:
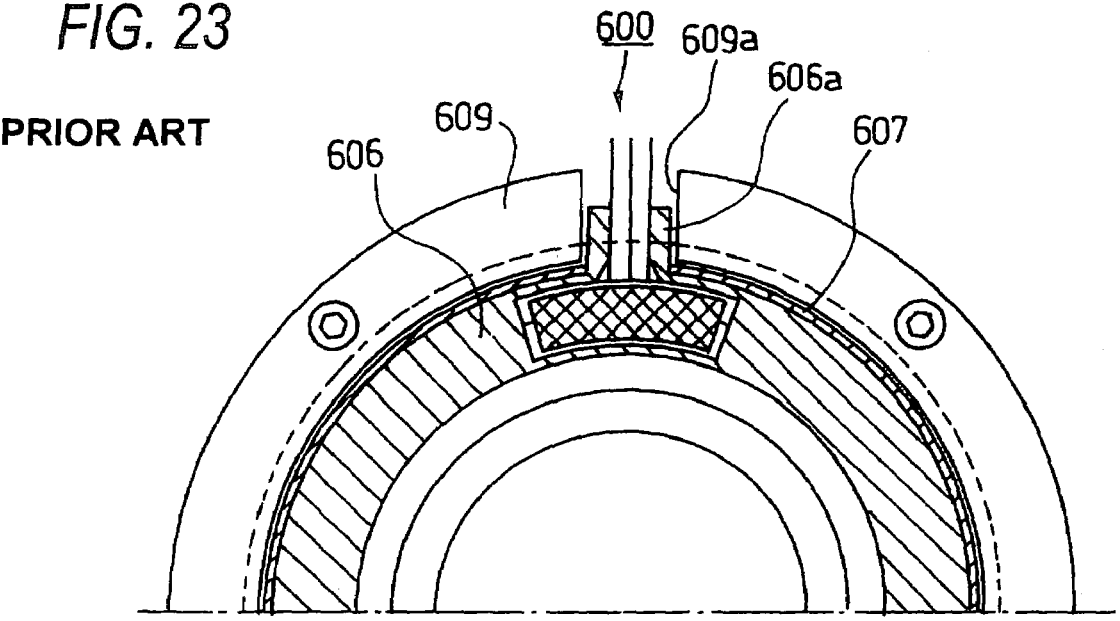
FIG. 23 is a front view showing the whirl-stopping structure of the conventional rotation sensor-bearing.
Figure 24:
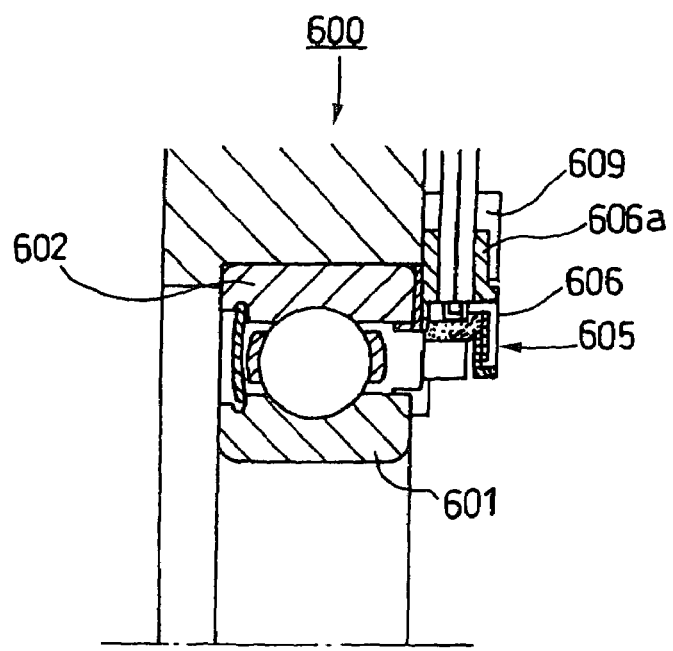
FIG. 24 is a cross-sectional view of the whirl-stopping structure of FIG. 23.
Figure 25:
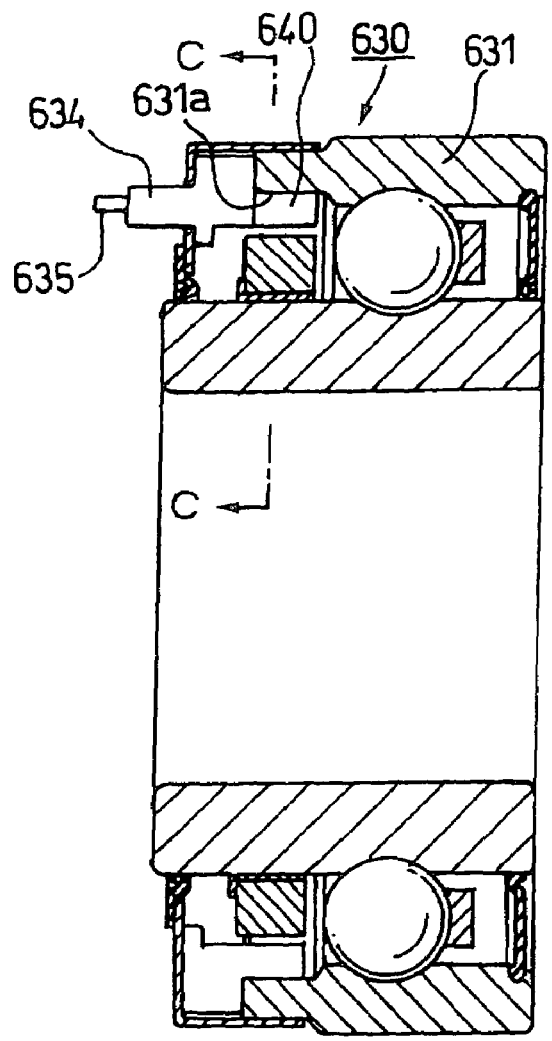
FIG. 25 is a cross sectional view showing the conventional sensor-bearing apparatus.
Figure 26:
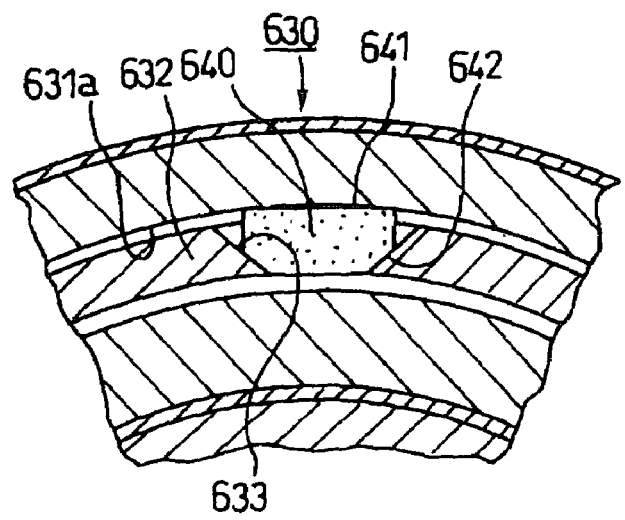
FIG. 26 is a cross sectional view along C-C line of the sensor-bearing apparatus of FIG. 25.
Figure 27:
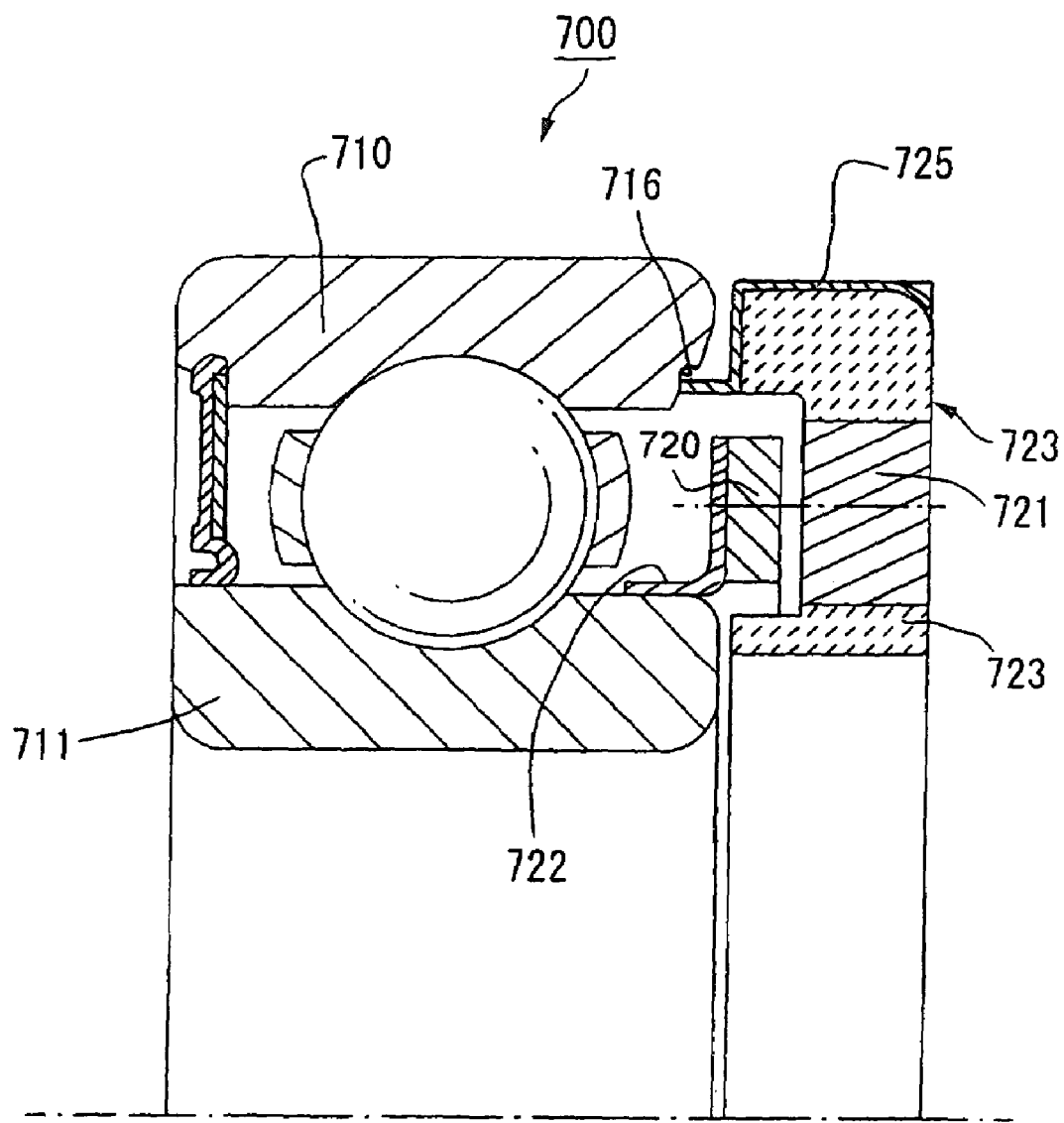
FIG. 27 is a cross sectional view of the element parts showing the conventional sensor-rolling bearing.
Figure 28:
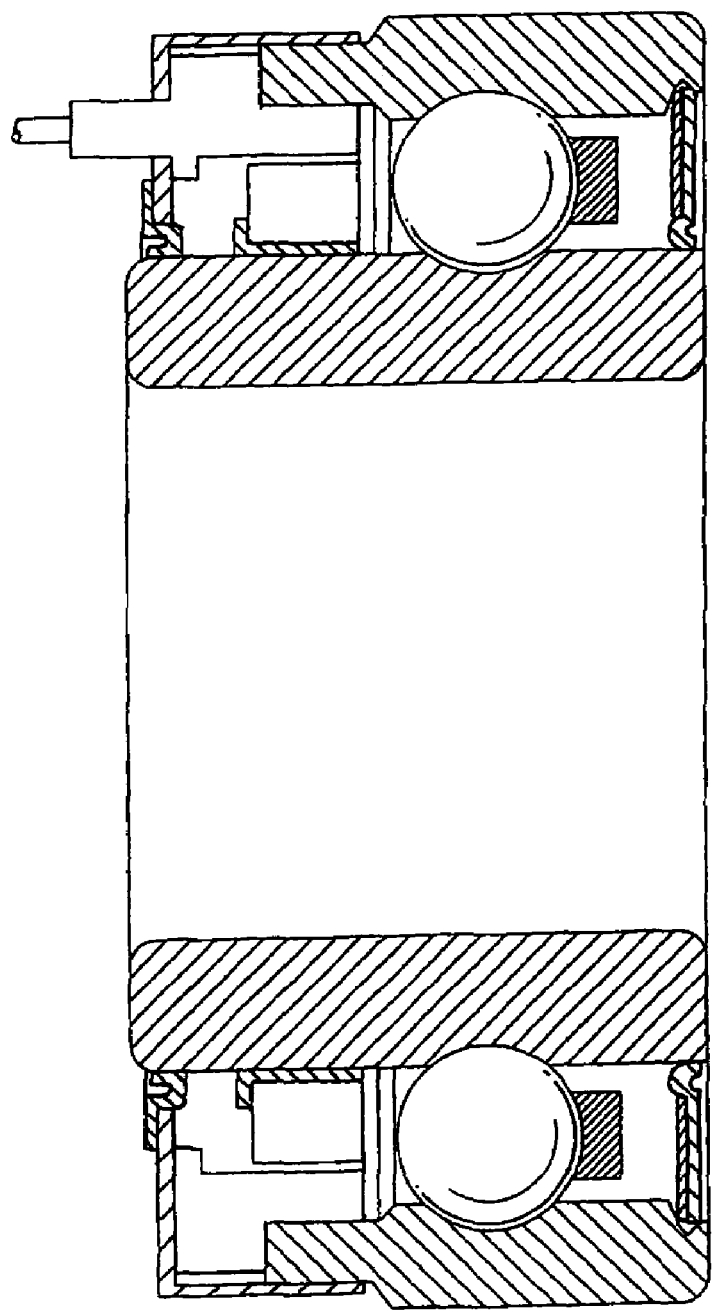
FIG. 28 is a whole cross sectional view showing another example of the conventional sensor-rolling bearing.
Figure 29:
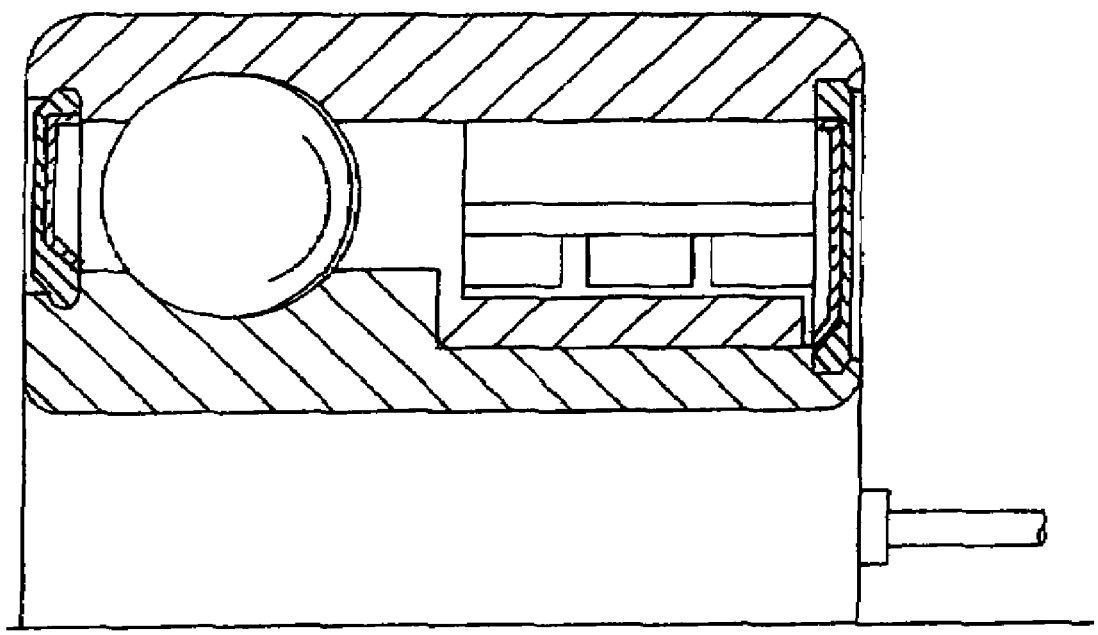
FIG. 29 is a whole cross sectional view of the element parts showing a further example of the conventional sensor-rolling bearing.

A necessary and enough rotation checking function of the outer ring 13 (the stationary-side bearing ring) can be secured and at the same time the high productivity can be maintained without requiring such as the whirl-stop member 107 as the conventional art (see FIGS. 23 and 24). Thereby, it is possible to curtail the number of parts, the setting-up process, and to lower costs.

The sensor-bearing apparatus of the second embodiment to the fourth embodiment can surely stop the rotation of the outer ring 13, enabling to protect load as the shearing force acting on the input-output signal wire 27 of the sensor 20 inserted in the openings 32, 42, 52 of the sensor covers 30, 40, 50, so that the breaking of the wire of the input-output signal wire 27 can be certainly avoided, and the reliability and the durability of the sensor 20 can be improved.

In addition, the creep phenomenon of the outer ring 13 can be prevented to heighten the reliability and the durability of the rolling bearing 10.

Neither extra groove nor cutout are necessary to provide in the outer ring 13 for checking the rotation of the outer ring 13, so that rigidity of the rolling bearing 10 can be avoided from declining.

For example, this embodiment can be applied to such a sensor-bearing apparatus where the inner ring is the stationary-side bearing ring, while the outer ring is rotary-side bearing ring.

FIFTH EMBODIMENT

Figure 9:
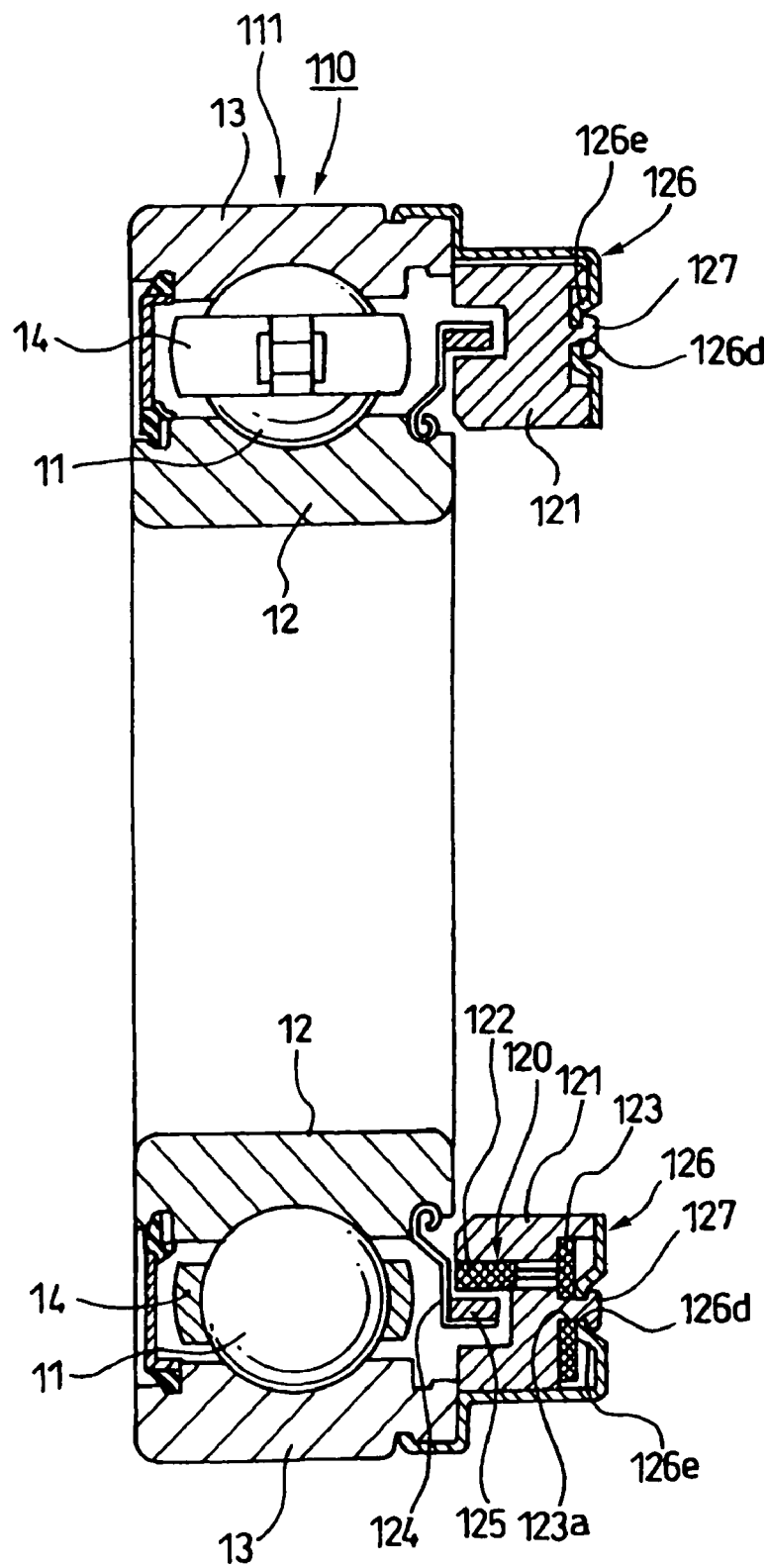
FIG. 9 is a cross sectional view showing the sensor-bearing apparatus as a fifth embodiment of the invention.
Figure 10:
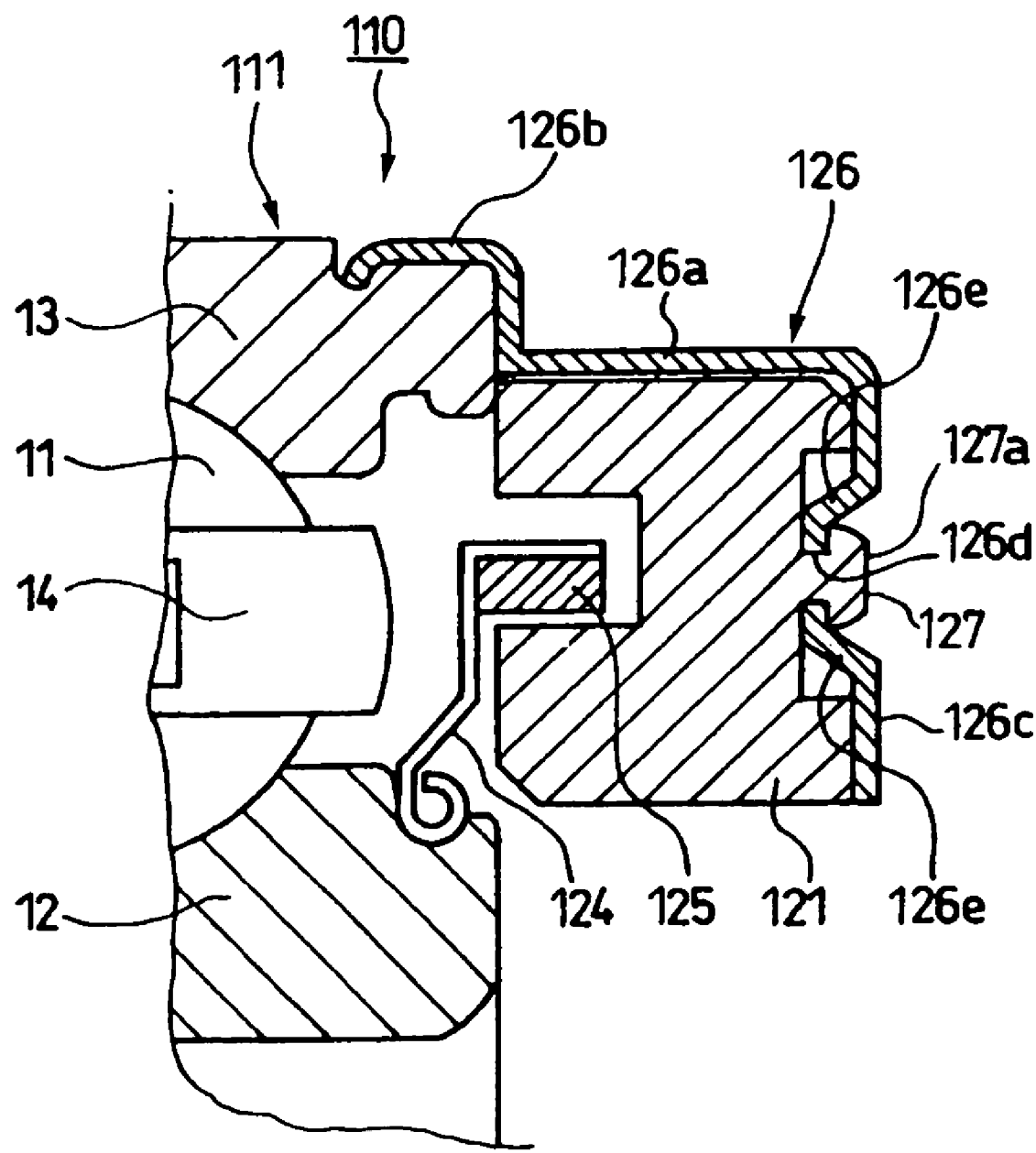
FIG. 10 is an enlarged cross sectional view of the element parts of the sensor-bearing apparatus of FIG. 9.
Figure 11:
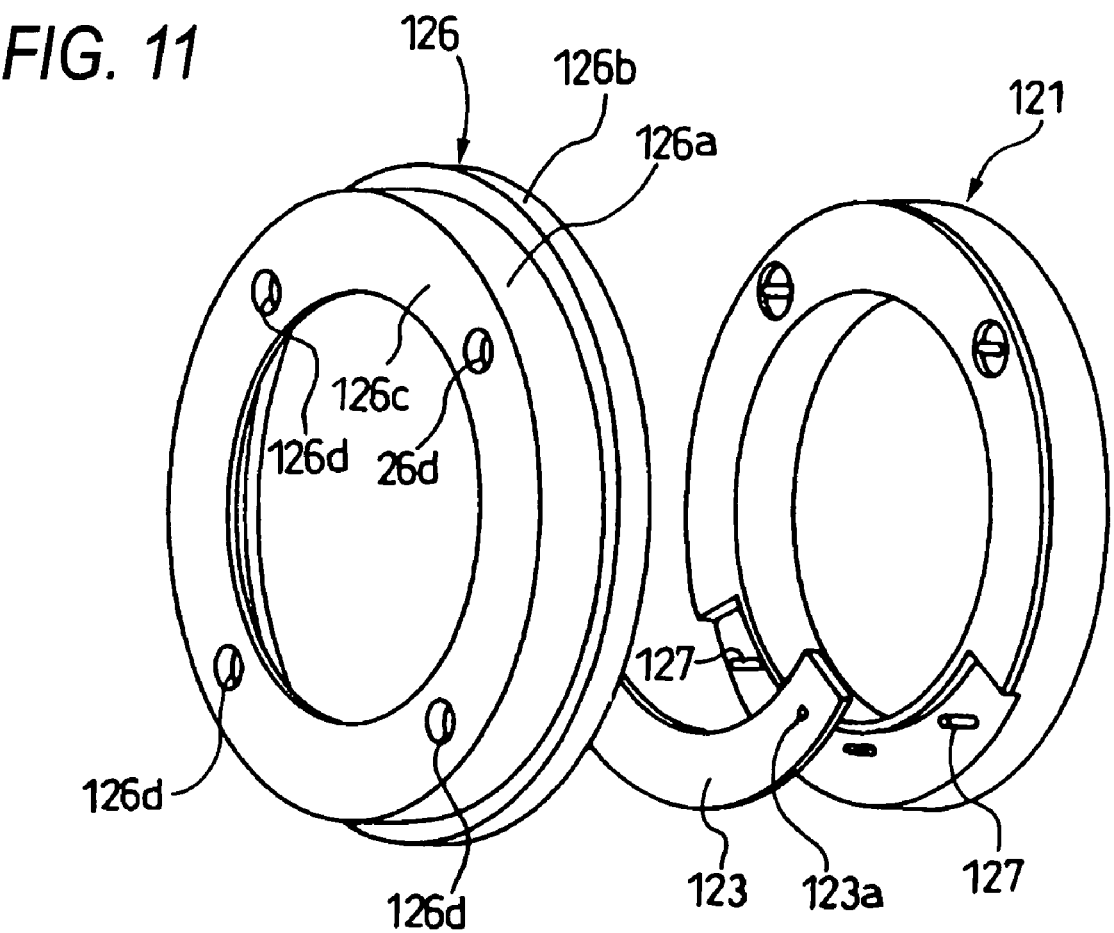
FIG. 11 is disassembled views showing the sensor cover, the sensor holder and the circuit substrate of the sensor-bearing apparatus of FIG. 9.
Figure 12:
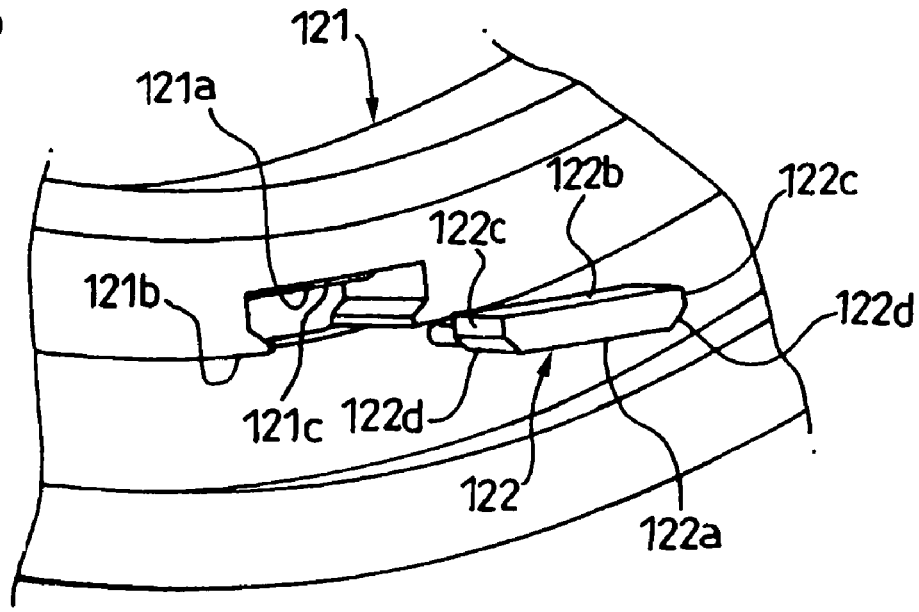
FIG. 12 is an enlarged perspective view showing the element parts around the sensor attaching groove of the sensor holder.

FIG. 9 is the cross sectional view showing the sensor-bearing apparatus as the fifth embodiment of the invention; FIG. 10 is the enlarged cross sectional view of the element parts of the sensor-bearing apparatus of FIG. 9; FIG. 11 is the disassembled views showing the sensor cover, the sensor holder and the circuit substrate of the sensor-bearing apparatus of FIG. 9; and FIG. 12 is the enlarged perspective view showing the element parts around the sensor attaching groove of the sensor holder.

As shown in FIG. 9, in the sensor-bearing apparatus 110, the basic structure of the rolling bearing 111 is similar to that of the first embodiment shown in FIG. 1, and although omitting the explanation given the same numerals, the holder 14 not shown in FIG. 1 is shown in FIG. 9, and a plurality of rolling elements 11 are held by the holder 14 equidistantly in the circumferential direction.

At one end face in the axial direction (the right end face in FIG. 9) of the rolling bearing 111, the sensor 120 is furnished.

The sensor 120 comprises the sensor body 122 supported by the ring shaped sensor holder 121, a later mentioned circuit substrate 123, and the multi-polar magnets (encoders) 125 fixed to the inner ring (the bearing ring at the movable side) 12 via the core metal 124 of the magnetic material, and is housed in the sensor cover 126.

The multi-polar magnet 125 rotates together with the inner ring 12. The sensor body 122 is provided with the two holes IC with a decided angle such that it is possible to detect the movement in the rotating direction and the number of rotation of the multi-polar magnet 125. The angle of the two holes IC is preferably decided such that phases of output wave are 90° at an electrical angle.

As seeing FIG. 10, the sensor cover 126 is formed by sheeting a metal sheet of, e.g., the magnetic material, and includes a ring shaped part 126a housing the sensor 120 inward, a flange part 126b at one end side in the axial direction (the left side in FIG. 10) of the ring shaped part 126a, and a side face 126c at the other side in the axial direction (the right side in FIG. 10). The sensor cover 126 is secured to the outer ring 13 by fitting the flange part 126b on the outer circumference of the outer ring (the rolling bearing of the stationary side) 13 of the rolling bearing 111.

The sensor holder 121 includes, e.g., a synthetic resin, having a decided elasticity, and is fitted inward of the sensor cover 126. At this time, the face of the outer diameter of the sensor holder 121 is fitted to the inner circumference of the sensor cover 126, leaving a predetermined space. The sensor holder 121 is, as shown in FIG. 12, defined in a decided position with a sensor attaching groove 121a which is provided with a step portion 121c for limiting a place of the sensor body 122 in the axial direction, and which is fitted (snapping engagement) with the sensor body 122 with a determined tightening margin owing to elastic deformation of the sensor holder 121. The sensor body 122 is attached under such a condition fitted in a manner that a bottom face 122b, a side face 122c and an oblique face 122d are engaged with the respectively corresponding faces of the sensor attaching groove 121a. At this time, the sensor body 122 is attached such that a front end 122a slightly projects than an edge of the sensor attaching groove 121a of the sensor holder 121. Therefore, as shown in FIG. 9, since the sensor 122 approaches at the front end 122a the side of the multi-polar magnet 125, the detecting precision of the sensor 122 more goes up.

As shown in FIGS. 9 to 11, the sensor holder 121 is provided with a plurality of positioning pins 127 respectively projecting in the axial direction with determined spaces in the circumferential direction. The sensor cover 126 is provided with a plurality of fitting holes 126d in the circumferential direction with determined spaces. The respective positioning pins 127 pass through the corresponding fitting holes 126d, thereby to position the sensor cover 126 and the sensor holder 121. Each of the positioning pins 127 penetrated in the fitting holes 126d is elastic-deformed at its front end (the right end in FIG. 10), whereby the sensor cover 126 and the sensor holder 121 are fixed each other.

The front end of the positioning pin 127 is made a hemispherical shape having a plane portion 127a by the plastic-deformation. Then, the plane portion 127a is positioned slightly inward (the left side of FIG. 10) than the side part 126c. As the actual examples of the plastic deformation, there are listed thermal deformation by heating, laser deposit, or supersonic welding.

The respective fitting holes 126d are made in corresponding positions to the respective positioning pins 127 in the sensor cover 126 along the axial direction (left and right in FIG. 9). The circumferential edge of the fitting hole 126d in the sensor cover 126 forms a projection 126e standing toward the side of the sensor holder 121 (the left side of FIG. 9). In the projection 126e, the sensor cover 126 engages the sensor holder 121 or the circuit substrate 123 so as not to contact other parts than the projection 126e.

Referring to FIGS. 9 and 11, the circuit substrate 123 causes the positioning pin 127 of the sensor holder 121 fitted in the hole 126d of the sensor cover 126 to pass through a through-hole 123a bored in a corresponding position, and is kept between the sensor cover 126 and the sensor holder 121. The circuit substrate 123 is mounted with an electronic circuit (not shown) processed signals by the sensor body 122. The contacting position between the circuit substrate 123 and the sensor cover 126 is limited to a position other than the electronic circuit of the circuit substrate 123 by means of the projection 126e formed in the circumferential part of the fitting hole 126d. This manner avoids a short circuit caused by contacting the electronic circuit of the circuit substrate 123 and the sensor cover 126.

The work of the sensor-bearing apparatus of this embodiment will be explained.

The sensor body 122 of the sensor 120 is fitted in the sensor attaching groove 121a formed in the determined position along the circumferential direction in the sensor holder 121 with the decided tightening margin in company with the elastic deformation of the sensor holder 121, and is positioned easily and at high precision. The sensor holder 121 is fitted inward of the sensor cover 126 with the determined space.

The positioning pins 127 of the sensor holder 121 are inserted in the corresponding fitting holes 126d of the sensor cover 126, and the sensor cover 126 and the sensor holder 121 are positioned at high precision without requiring the complicated process as the inserting formation.

Further, the positioning pins 127 of the sensor holder 121 pass through the fitting holes 126d under the condition of inserting the positioning pins 127 in the fitting holes 126d, and the inserted positioning pin 127 is plastic-deformed at the front end. Accordingly, in case an external force as the vibration is effected, the sensor body 122 is certainly prevented from dropping or dislocation.

The positioning pin 127 of the sensor holder 121 passes through the through-hole 123a defined in the position corresponding to the circuit substrate 123, and is inserted in the fitting hole 126d corresponding to the sensor cover 126. Thus, the circuit substrate 123 is positioned at high precision between the sensor cover 126 and the sensor holder 121, and is held.

The circumferential parts of the respective fitting holes 126d in the sensor cover 126 form the projections 126e standing toward the side of the sensor holder 121, and the only projections 126e engage the sensor cover 126 and the sensor holder 121 or the circuit substrate 123. The contacting position between the sensor cover 126 and the circuit substrate 123 is limited to the position other than the electronic circuit of the circuit substrate 123. This manner exactly avoids the short circuit caused by contacting the electronic circuit of the circuit substrate 123 and the sensor cover 126.

In the sensor-bearing apparatus 110 of this embodiment, the sensor body 122 of the sensor 120 is fitted in the sensor attaching groove 121a defined in the determined position along the circumferential direction in the sensor holder 121 owing to the elastic deformation of the sensor holder 121 with the decided tightening margin. Therefore, the sensor body 122 can be positioned easily and at high precision without requiring the complicated process as the insert form, whereby it is possible to provide, at lower costs, the sensor-bearing apparatus 110 having the highly detecting precision.

SIXTH EMBODIMENT

Figure 13:
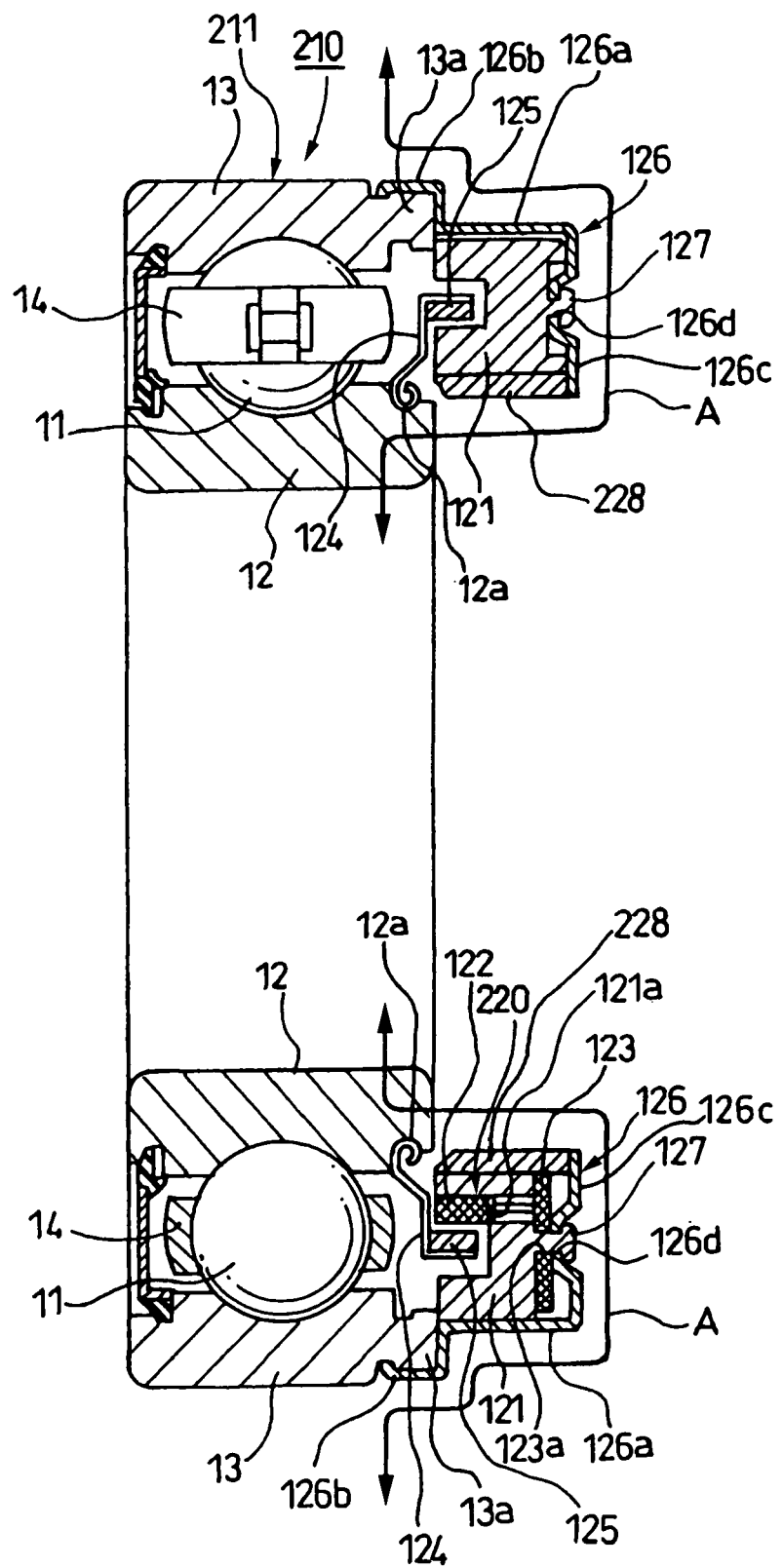
FIG. 13 is a whole cross sectional view showing the sensor-bearing apparatus as a sixth embodiment of the invention.

FIG. 13 is the whole cross sectional view showing the sensor-bearing apparatus as a sixth embodiment of the invention.

As shown in FIG. 13, in the sensor-bearing apparatus 210, the rolling bearing 211 is provided with magnetically sensitive sensor 220 at one side in the axial direction (the right side of the same). The basic structures of the rolling bearing 211 and the magnetically sensitive sensor 220 are similar to those of the fifth embodiment shown in FIG. 9 except parts to be mentioned in detail in the following, and the explanation is omitted by giving the same numerals.

In the magnetically sensitive sensor 220, the conductive member 228 having the electromagnetic shielding effect is formed as one body with the sensor holder 121 in the inner circumference of the sensor holder 121. The conductive member 228 covers the inner circumference of the sensor holder 121, and shields electromagnet acting in the direction from the inner diametrical side of the bearing to the sensor body 122.

As practical methods of integrally forming the sensor holder 121 and the conductive member 228, there are a 2-color molding of a conductive resin, adhesion or pressing into fixture. The conductive member 282 includes iron powder, magnetic powder, resin mixed with carbon black rubber, paint or adhesive.

The magnetically sensitive sensor 220 may be structured to have the position detecting hole IC and the rotation number detecting hole IC, instead of furnishing the two holes IC with the determined angle.

In the sensor-bearing apparatus 210 of this embodiment, the bearing inner diametrical side of the sensor body 122 is shielded from the electromagnet by means of the conductive member 228 having the electromagnetic shielding effect The multi-polar magnet (the encoder) 125 is disposed between the sensor body 122 and the sensor holder 121.

Figure 30:
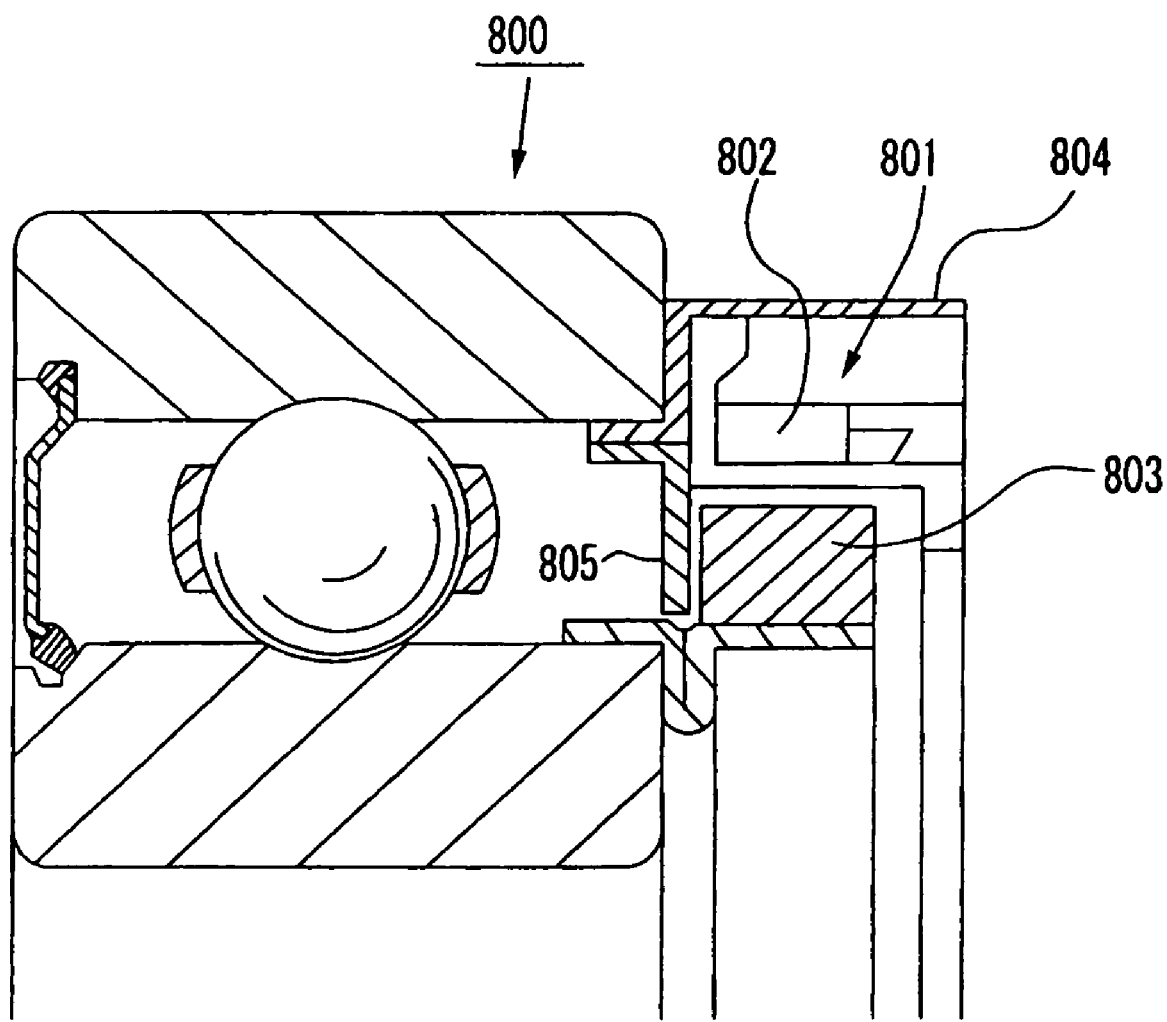
FIG. 30 is a whole cross sectional view of the element parts showing another example of the conventional sensor-bearing apparatus.
Figure 31:
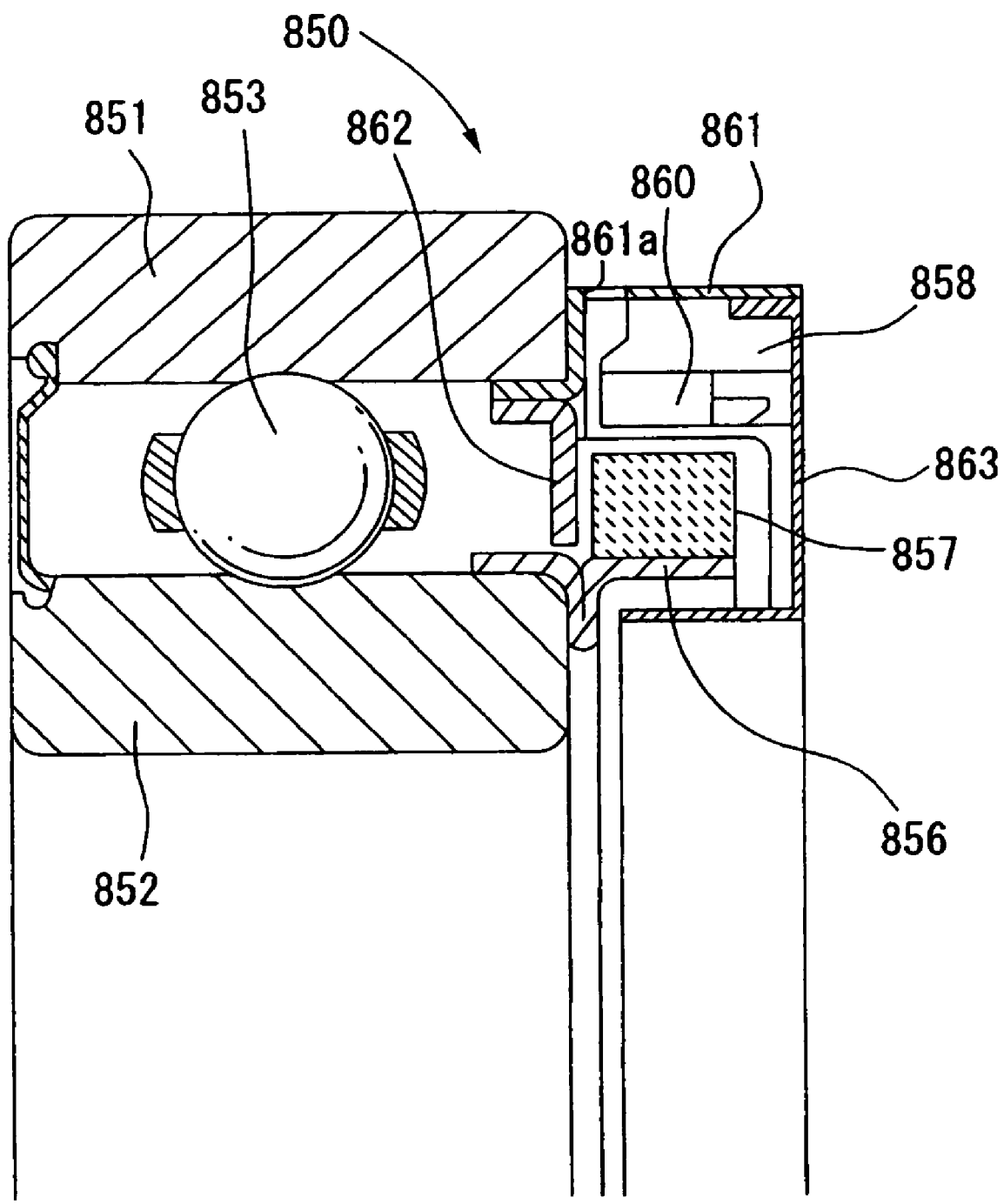
FIG. 31 is a cross sectional view of the element parts showing another example of the conventional sensor-bearing apparatus.
Figure 32:
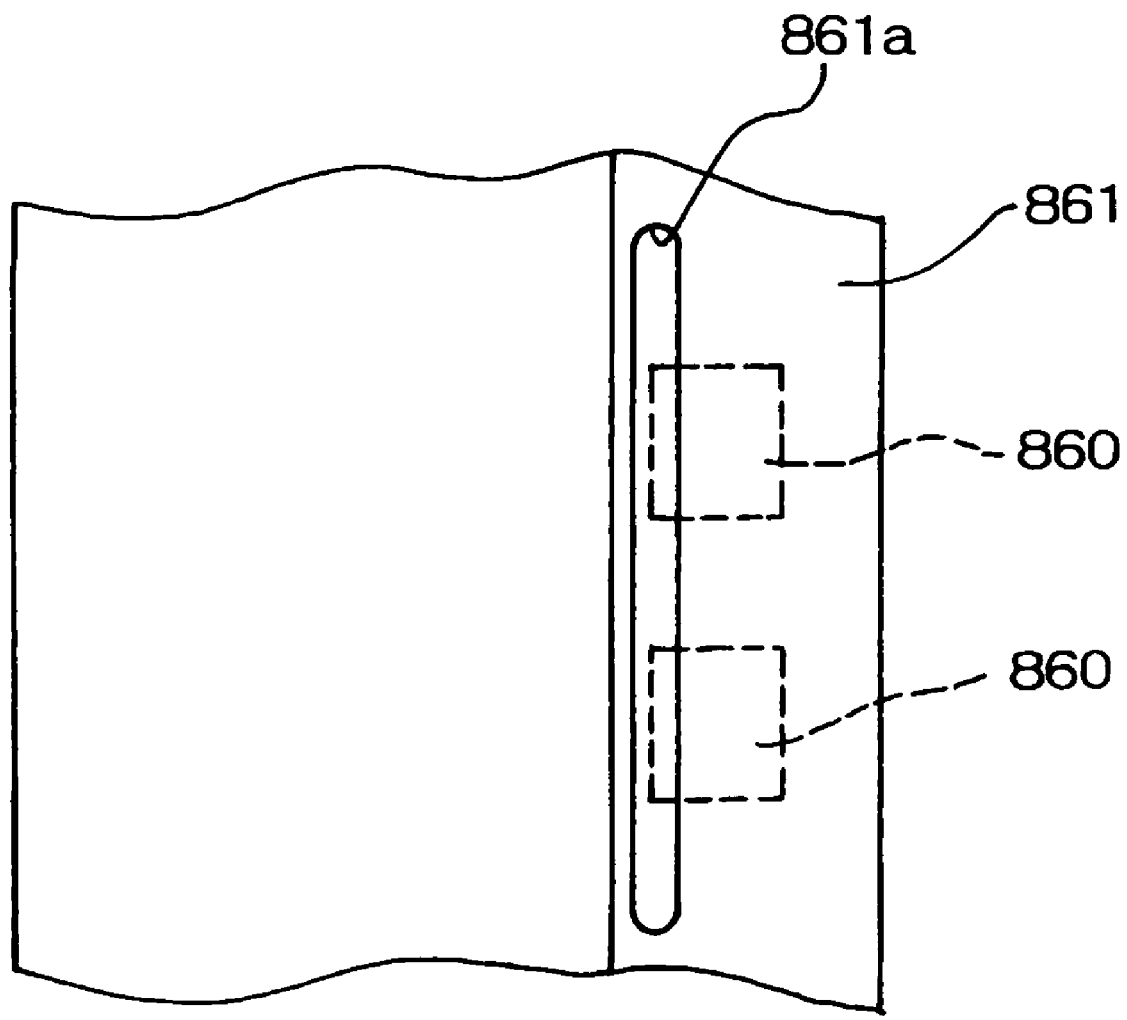
FIG. 32 is a partially plan view of FIG. 31.

In the conventional sensor-bearing apparatus or sensor-rolling bearing (see FIGS. 30 and 31), in case of being attached to a motor (not shown), the magnetic field is generated, and the leakage magnetic flux flows out through the core metal→the multi-polar magnet→the sensor body→the sensor cover.

On the other hand, in the inventive sensor-bearing apparatus 210, the leakage magnetic flux directing from the bearing inner diametrical side to the outer diametrical side is, as shown with arrows in FIG. 13, prevented from entering into the sensor cover 126 by the conductive member 228, and detours along the surface of the sensor cover 126. In short, since the leakage magnetic flux does not flow into the sensor body 122, the detecting signal influencing the leakage magnetic flux is not issued.

Therefore, each of the sensor body 122 and the multi-polar magnet 125 is shielded by the conductive member 228 from the leakage magnetic flux directing from the bearing inner diametrical side to the outer diametrical side, and the leakage magnetic flux is effectively bypassed. Thus, the sensor-bearing apparatus 210 can avoid erroneous actions of the magnetically sensitive sensor 220.

Being disposed in order of the sensor body 122, the multi-polar magnet 125, and the sensor cover 126 from the bearing inner diametrical side, even if the external leakage magnetic flux goes into the sensor part, the magnetic field reversely flows in the parts of the core metal 126→the multi-polar magnet 125→the sensor body 122, and the magnetic field is difficult to flow, so that the majority of the invading leakage magnetic flux is bypassed to other parts.

SEVENTH EMBODIMENT

Figure 14:
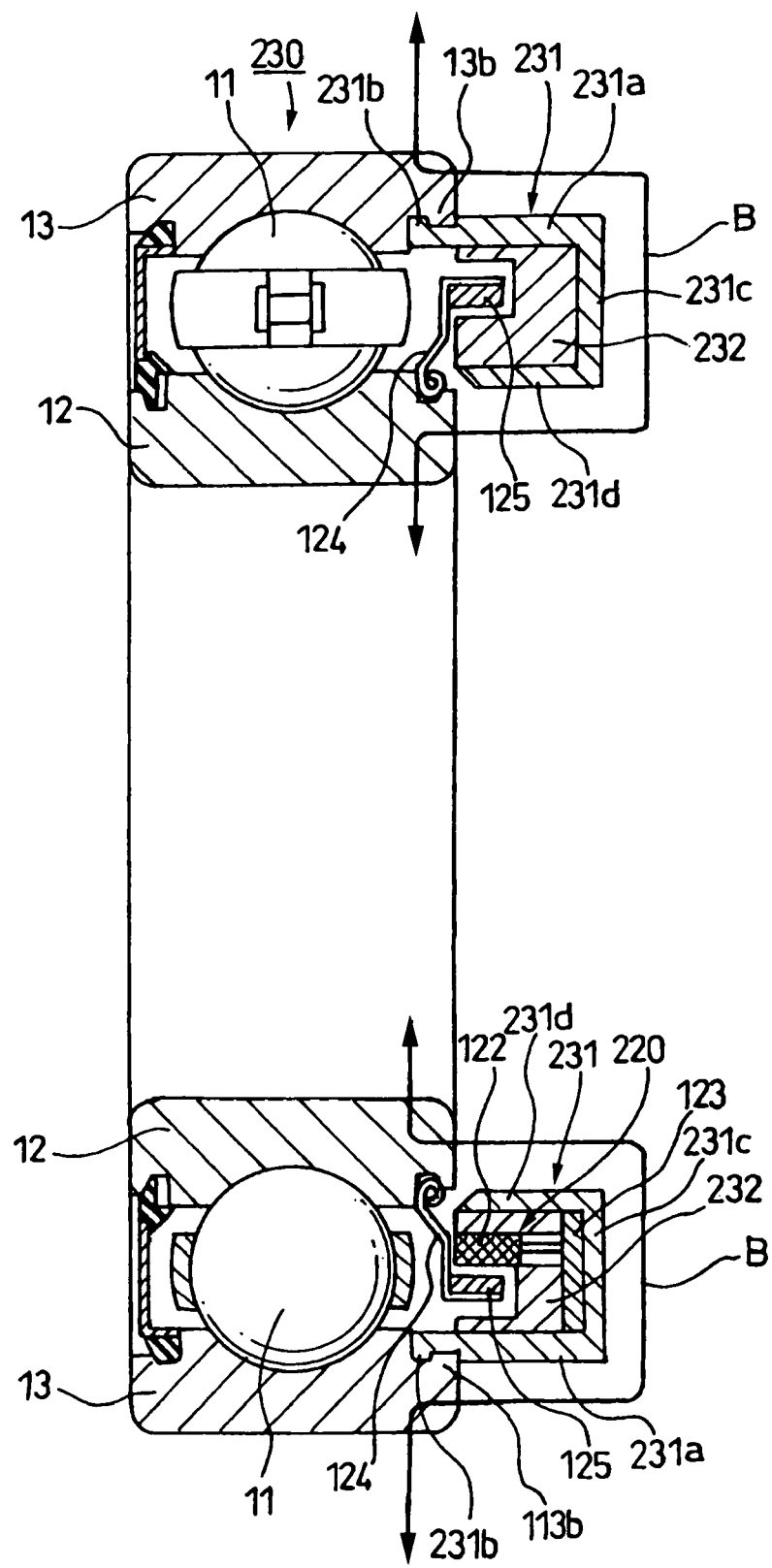
FIG. 14 is a whole cross sectional view showing the sensor-bearing apparatus as a seventh embodiment of the invention.

FIG. 14 is the whole cross sectional view showing the sensor-bearing apparatus as a seventh embodiment of the invention. By the way, in the following embodiment, as to the members having the equivalent structures or actuations to those of the members already mentioned, the explanation will be simplified or omitted by giving the same or corresponding numerals in the accompanied drawings.

As shown in FIG. 14, in the sensor-bearing apparatus 230 of the seventh embodiment, the sensor cover 231 is formed with a conductive member, instead of the conductive member (see FIG. 13) formed as one body with the above mentioned sensor holder 121.

That is, the sensor cover 231 comprises an outer diametrically ring shaped portion 231*a* enabling to house the magnetically sensitive sensor 220 therein, a flange portion 231*b* provided at one end side in the axial direction (the left side in FIG. 14) of the outer diametrically ring shaped portion 231*a*, a side face 231*c* at the other end side in the axial direction (the right side in the same) of the outer diametrically ring shaped portion 231*a*, and an inner diametrically ring shaped portion 231*d* provided at the bearing inner diametrical side end of the side face 231*c*. The sensor cover 231 is secured to the outer ring 13 by mounting the flange part 231*b* on the inner circumference 13*b* of the outer ring (the bearing ring of the stationary side) of the sensor-bearing apparatus 230.

The sensor cover 231 covers the outer whole of the sensor holder 232 except the bearing side (the right side of FIG. 14) thereof for shielding the electromagnet of the magnetically sensitive sensor 220 to the sensor body 122. In short, the sensor cover 231 has the function of fixing the sensor body 122 to the outer ring 13 and bypassing the external leakage magnetic flux.

Herein, in the sensor-bearing apparatus 230, the leakage magnetic flux directing from the bearing inner diametrical side to the outer diametrical side is, as shown with arrows in FIG. 14, prevented from entering into the sensor cover 231 by the inner diametrically ring shaped portion 231*d* of the sensor cover (the conductive member) 231, and detours along the surface of the sensor cover 231. In short, since the leakage magnetic flux does not flow into the sensor body 122, the detecting signal influencing the leakage magnetic flux is not issued.

Further, it is unnecessary to independently provide the sensor cover and the conductive member, so that the number of parts and the setting-up process can be further curtailed.

Other structures and works are similar to those of the above mentioned sixth embodiment.

According to the sensor-bearing apparatus 230 of this embodiment, the sensor body 122 of the magnetically sensitive sensor 220 is shielded from the electromagnet by means of the sensor cover 231 formed with the conductive member, and the multi-polar magnet 125 is disposed between the sensor body 122 and the sensor holder 232.

Therefore, the external leakage magnetic flux can be effectively bypassed by the less number of parts. Thus, the sensor-bearing apparatus 230 can avoid erroneous actions of the magnetically sensitive sensor 220.

Incidentally, the invention is not limited to the above mentioned embodiments, but appropriate deformations and improvement are available.

For example, for the above mentioned magnetically sensitive sensor 220, sensors of other types may be employed.

EIGHTH EMBODIMENT

Figure 15:
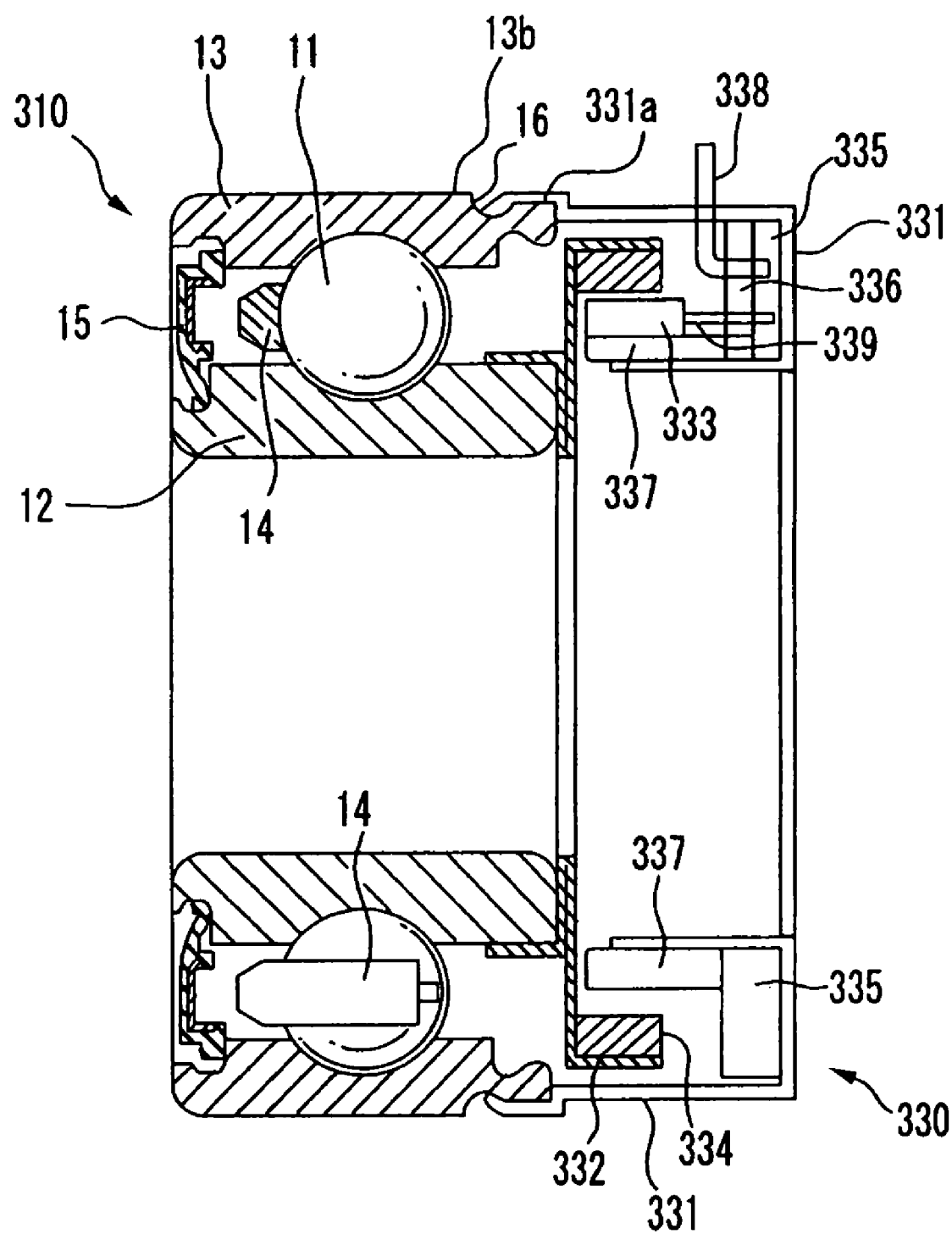
FIG. 15 is a cross sectional view showing the sensor-rolling bearing as an eighth embodiment of the invention.

FIG. 15 is the cross sectional view showing the sensor-rolling bearing as an eighth embodiment of the invention. The basic structure of the sensor-rolling bearing 310 is similar to that of the fifth embodiment shown in FIG. 9 except parts to be mentioned in detail in the following, and the explanation is omitted by giving the same numerals.

Namely, in the sensor-rolling bearing 310, the seal 15 is expanded toward the inner ring 12 in the vicinity of one side of the outer ring 13, and the seal 15 covers the bearing space under the condition that the seal 15 contacts both of the inner ring 12 and the outer ring 13. The outer ring 13 is defined with a concave groove 16 in the end of the outer diametrical face thereof along the circumferential direction of the outer ring 13.

The sensor portion 330 of the sensor-rolling bearing 310 comprises the sensor cover 331 as the attaching member, the magnet holder 332 as the attaching member, the magnetically sensitive sensor 333, the magnet 334 as a magnetic part to be detected, a spacer 335, the circuit substrate 336, and the sensor positioning member 337.

The sensor cover 331 is the ring shaped magnetic member having a rectangular shape viewed in cross section, and is secured in that one end 331*a* is caulked in the concave groove 16 formed in the outer diametrical face 12*b* of the outer ring 12.

Figure 16:
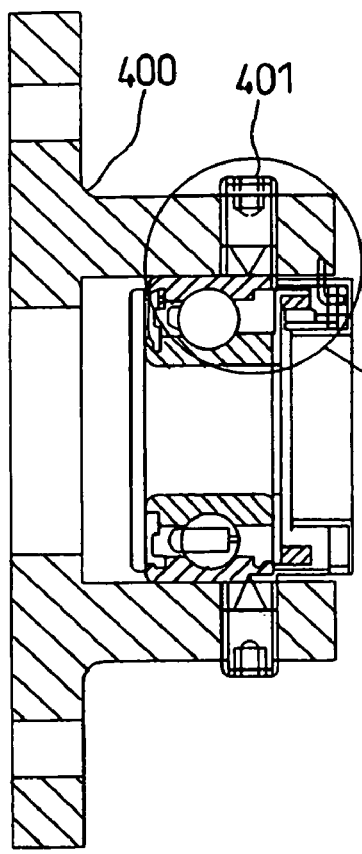
FIGS. 16(a) to 16(c) are views showing the caulking method of the sensor holder.
Figure 16:
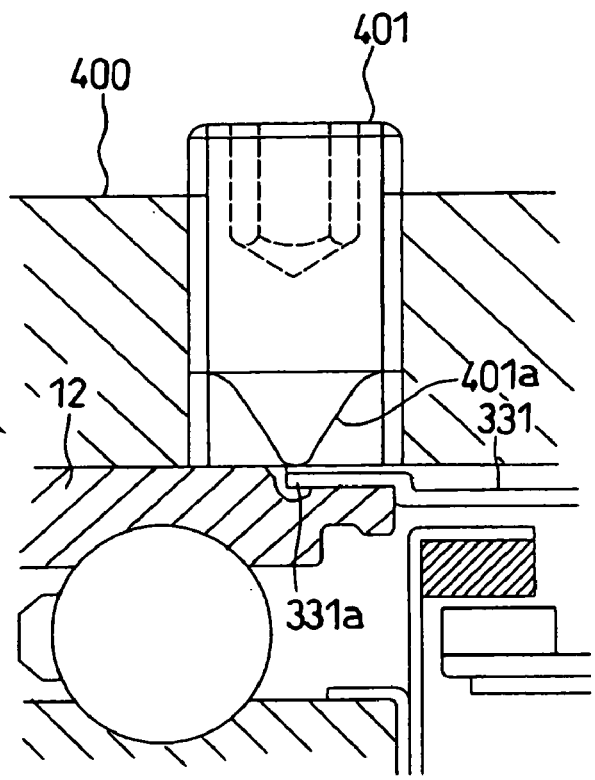
Figure 16:
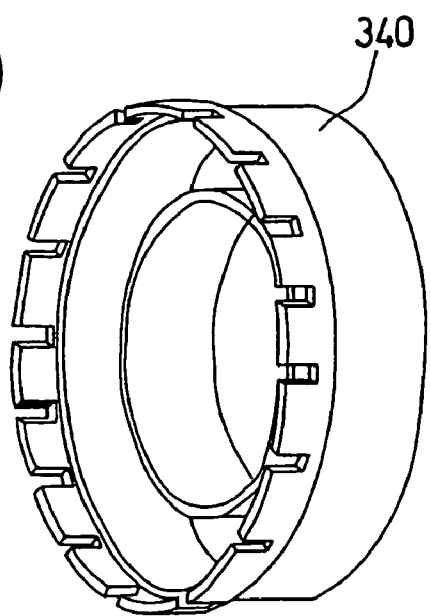

FIGS. 16(*a*) and (*b*) are views showing a method of caulking and securing one end 331*a* of the sensor cover 331 in the concave groove 16 formed in the outer diametrical face 13*b* of the outer ring 13. Herein, in a caulker 400, caulking screws 401 are equidistantly provided in the circumferential direction of the ring shaped sensor cover 331, that is, disposed in an equiangular arrangement in positions of nZ±X. The caulker 400 forces to tighten the caulking screws 401, so that the front end 401*a* of the caulking screw 401 firmly secures one end 331*a* of the sensor cover 331 into the concave groove 16. Herein, n is a positive integer, Z is the number of balls in the bearing, and X is the positive integer of 2 or more. That is, the number of caulking positions is desirably prime. The sensor cover to be caulked and secured may employ such a sensor cover 340 equidistantly formed cutouts in one end as shown in FIG. 16(*c*).

If the rolling bearing has waviness of comparatively large top height in the bearings of the inner ring and the outer ring, abnormal noises are issued or the bearing is vibrated at constant frequency. In case the bearing of such waviness is mounted on a shaft, the shaft is subjected to especial whirling movements undesirably in practice. Abnormal noises or vibrations are generated when the number of waviness is nZ or nZ±X.

The caulking has probability of deforming the outer ring or the inner ring of the bearing, and generating waviness of nZ or nZ±X. Accordingly, this embodiment specifies the number of caulking position to be nZ±X (X≧2) for preventing generation of vibration in order not to create waviness of nZ or nZ±X.

The sensor cover 331 holds the magnetically sensitive sensors 33 at the decided positions via the sensor positioning member 337 on the side face of the inside end parts in rectangular shape in cross section. The magnetically sensitive sensor 333 is connected to the circuit substrate 336 disposed via the spacer 335 on the side face of the more inside in rectangular shape. The circuit substrate 336 is connected to a cable wire 338 for outputting outside from the sensor body 333.

On the other hand, the magnet holder 332 is the ring shaped magnetic member whose front ends are bent to face the front ends of the sensor cover 331. In this embodiment, the magnet holder 332 is forced to be fixed in the outer diametrical end part 12*b* of the inner ring 12. The magnet holder 332 extends toward the side of the outer ring 13 to close the bearing space from the inner ring 12, and functions as a cover shielding the bearing space.

The magnet holder 332 holds the magnet 334 on the front end facing the magnetically sensitive sensor 333. With this arrangement, the sensor cover 331 and the magnet holder 332 hold the magnetically sensitive sensor 333 and the magnet 334 at the places not to expose the outside. Herein, the sensor cover 331 and the magnet holder 332 include the magnetic material, and therefore functions as the magnet shield not to transmit variations in the magnetic field caused by the magnetic noises to the magnetically sensitive sensor 333 and the magnet 334. If using, as the material of the magnet 334, neodymium-iron-boron (Nd—Fe—B) or samarium-cobalt (Sm—Co), resistance to the external magnetism is more increased.

Figure 17:
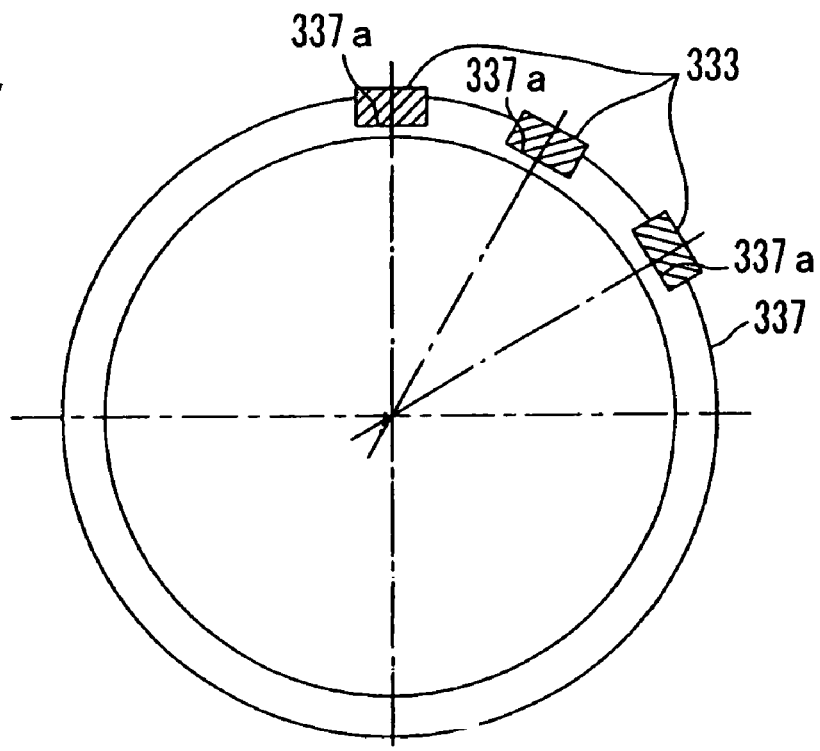
FIG. 17 is a cross sectional view showing the magnetically sensitive sensor and the sensor positioning members.

FIG. 17 is the cross sectional view showing the magnetically sensitive sensor and the sensor positioning members. The sensor positioning member 337 is the ring shaped member on the sensor cover 331. The sensor positioning member is so disposed as to be concentric with the rotating center of the shaft. The sensor positioning member 337 of this embodiment is defined with three concaves 337*a* for fixedly positioning the magnetically sensitive sensor 333 in the outer diametrical face, and each of the concaves 337*a* is inserted with the magnetically sensitive sensor 333. In this embodiment, the magnetically sensitive sensors 333 are disposed in the same circumference at the determined angular space with respect to the rotation center of the shaft.

The number of the magnetically sensitive sensors 333 to be attached can be varied into arbitrary number in response to usage of the sensor-rolling bearing, while the number of the concaves 337*a* to be formed in the sensor positioning member 337 is also varied into arbitrary number in response to the number of the sensors. The structure of this embodiment is for detecting a phase angle of each phase of a three-phase motor, and for detecting the rotation speed of the shaft, at least one sensor is enough, and for detecting the rotating direction at the same time, two sensors are sufficient.

Figure 18:
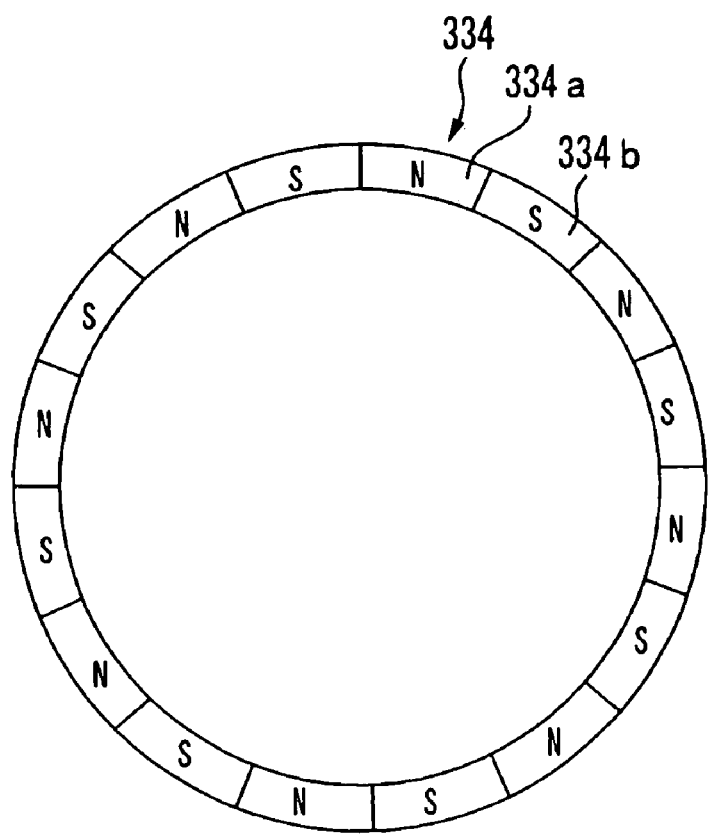
FIG. 18 is a cross sectional view showing a structure of the magnet.

FIG. 18 is the cross sectional view showing the structure of the magnet 334. The magnet 334 is fixed at the outer diametrical face to the magnet holder 332, and is opposite to the magnetically sensitive sensor 333 and the sensor positioning member 337. In the embodiment, the magnet 334 is structured in that eight pieces of N poles 334*a* of the same shape and eight pieces of S poles 334*b* are alternately connected in ring. The magnet 334 is, similarly to the sensor positioning member 337, disposed to be concentric with the shaft rotating center, and rotates together with the rotation of the inner ring 12. Being concentric with the sensor positioning member 337, the distance between the magnet and the magnetically sensitive sensor 333 is not changed, irrespective of the rotating position of the magnet 334. Each of N poles 334*a* and S poles 334*b* is arranged such that the magnetic flux density is made strong in the direction of the magnetically sensitive sensor 333.

The number of the magnetic poles of the magnet 334 is varied into arbitrary number in response to using conditions of the sensor-rolling bearing 310 similarly to the number of the magnetically sensitive sensor 333.

The magnetically sensitive sensor 333 rotates together with rotation of the shaft, detects intensity of the magnetic field formed by each magnetic pole of the magnet 334, and outputs it as an electric signal. The output electric signal is sent to the circuit substrate 336 through the signal wire, subjected to a predetermined process, and then output through the signal wire 338 to a measuring device installed outside. The measuring device is based on the received electric signal to obtain information such as rotation speed, rotating direction and phase angle of the three phases.

The sensor-rolling bearing 310 of the eighth embodiment is secured in that the sensor cover 331 holding the magnetically sensitive sensor 333 caulks the plural positions in the concave groove 16 defined in the outer diametrical face of the outer ring 13. Further, the magnet holder 332 holding the magnet 334 is forced to fix the end of the inner ring 12. Therefore, it is possible to dispose the magnetically sensitive sensor 333 and the magnet 334 in the right position, without providing the step portion of much dispersion in size.

The sensor cover 331 and the magnet holder 332 of a blank being the magnetic material shield the external magnetic field, so that no fear exists that variations of the external magnetic field give influences to the magnetically sensitive sensor 333 and the magnet 334. Thus, the accurate measure is possible not being affected by variations of the external magnetic field.

The magnet 334 is positioned at the outer diametrical side of the magnetically sensitive sensor 333, and the outer diametrical side of the magnet 334 is supported by the magnet holder 332. Therefore, the present structure avoids breakage of the magnet 334 by strong centrifugal force generated when the shaft rotates at high speed.

Since the number of caulking positions is determined to be nZ±X (X≧2), it is possible to restrain occurrence of waviness of nZ or nZ±1 piece in the raceway surface of the bearing owing to deformation by caulking. Therefore, it is possible to provide the sensor-rolling bearing of high precision without issuing abnormal noises or vibrations.

The sensor-rolling bearing 310 of this embodiment may be applied as the bearing of the shaft used to automobiles, railway carriers, iron-making facilities, or machine tools for detecting rotation speed of shafts of various devices.

NINTH EMBODIMENT

Figure 19:
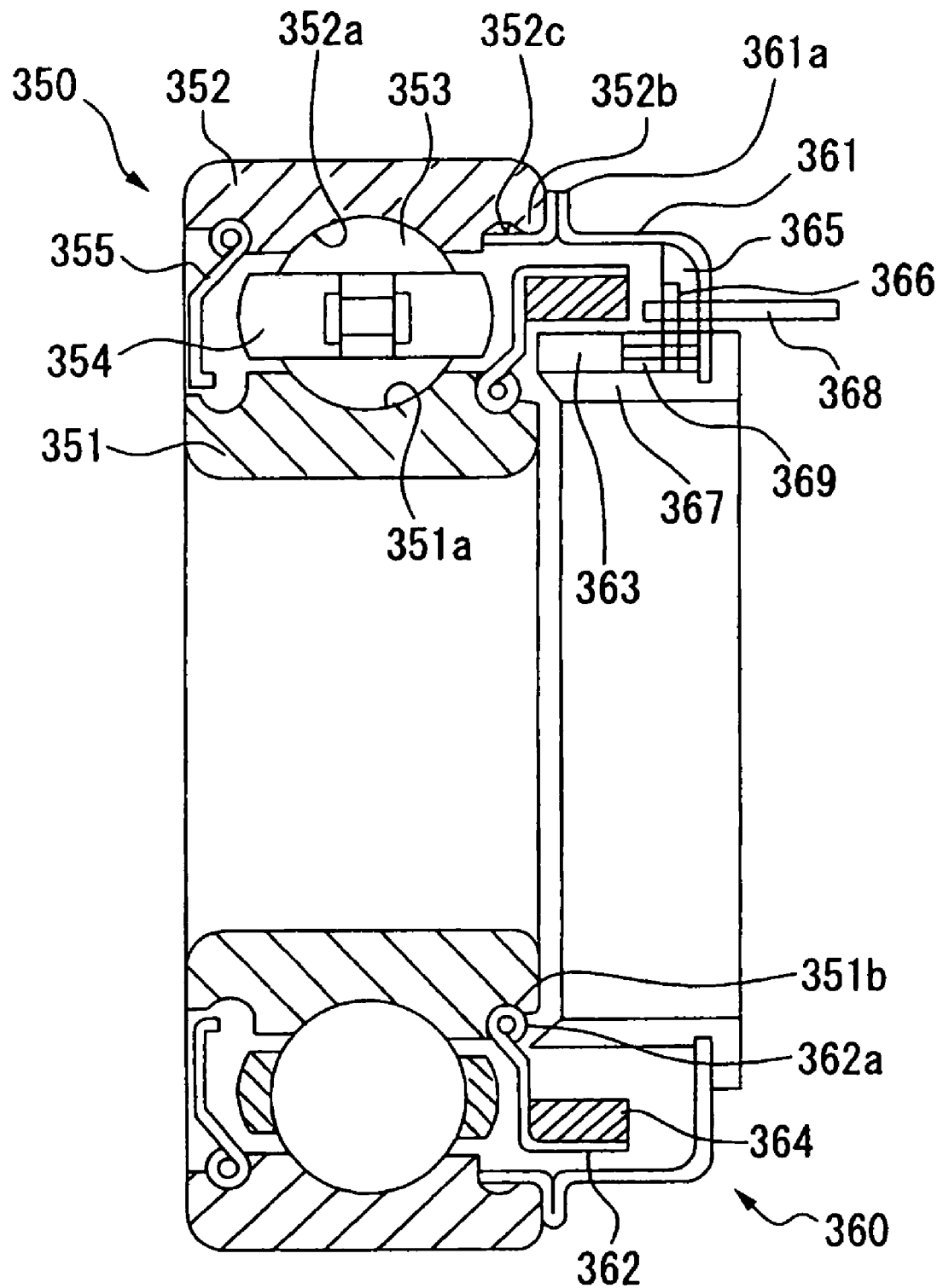
FIG. 19 is a cross sectional view showing the sensor-rolling bearing as a ninth embodiment of the invention.

FIG. 19 is the cross sectional view showing the sensor-rolling bearing as a ninth embodiment of the invention. The sensor-rolling bearing 350 comprises the inner ring 351 mounted on the shaft, the outer ring 352 fitted in the housing, balls 353 as the rolling elements rolling along an inner ring raceway 351a and an outer ring raceway 352a respectively formed in the outer diametrical face of the inner ring 351 and in the inner diametrical face of the outer ring 352, a holder 354 holding the balls 353, and the shielding plate 355 standing from the vicinity of one side of the outer ring 352 toward the inner ring 351 for covering the vacancy of the bearing defined between the inner ring 351 and the outer ring 352. This embodiment defines a concave groove 351b along the circumferential direction of the inner ring 351 nearly one end of the outer diametrical face 351b of the inner ring 351.

The sensor portion 360 of the sensor-rolling bearing 350 comprises the sensor cover 361 as the attaching member, the magnet holder 362 as the attaching member, the magnetically sensitive sensor 363, the magnet 364 as the magnetic part to be detected, the spacer 365, the circuit substrate 366, and the sensor positioning member 367.

The sensor cover 361 is the ring shaped magnetic member of L-shape. The sensor holder 361 has one end which is forced to be secured in the concave groove 352c formed along the circumferential direction on the inner diametrical face of the end 352b of the outer ring 352. The sensor cover 361 is provided at the L-shaped other end with the sensor positioning member 367 in parallel in the axial direction. The sensor positioning member 367 has the magnetically sensitive sensor 363 at the decided part. The magnetically sensitive sensor 363 is connected to the circuit substrate 366 disposed on the L-shaped inside face via the spacer 365. The circuit substrate 366 is connected to a cable wire 368 for outputting outside from the sensor body 363.

On the other hand, the magnet holder 362 is the ring shaped magnetic member whose front ends are bent to face the front ends of the sensor cover 361. In this embodiment, one end 362a of the magnet holder 362 is caulked to be fixed in the concave groove 351b formed in the circumferential direction along the outer diametrical face of the inner ring 351. This embodiment specifies the number of caulking positions to be nZ±X (X≧2) for preventing generation of vibration. The magnet holder 362 extends to the side of the outer ring 352 to close the bearing space from the inner ring 351, and functions to shield the bearing space.

The magnet holder 362 holds the magnet 364 on the front end facing the magnetically sensitive sensor 363. With this arrangement, the sensor cover 361 and the magnet holder 362 hold the magnetically sensitive sensor 363 and the magnet 364 at the places not to expose the outside. Herein, the sensor cover 361 and the magnet holder 362 include the magnetic material, and therefore functions as the magnet shield not to transmit variations in the magnetic field caused by the magnetic noises to the magnetically sensitive sensor 363 and the magnet 364.

The magnetically sensitive sensor 363 and the magnet 364 have the structures equivalent to those of the magnetically sensitive sensor 333 and the magnet 334 of the eighth embodiment.

The sensor-rolling bearing 350 of the ninth embodiment is secured in that the sensor cover 361 holding the magnetically sensitive sensor 363 is forced to be fixed in the end of the inner ring 351. Further, the magnet holder 362 holding the magnet 364 is fixed by caulking, in the plural positions, one ends 362a in the concave groove 351b formed in the outer diametrical face of the inner ring 351. Therefore, it is possible to dispose the magnetically sensitive sensor 363 and the magnet 364 in the right position, without providing the step portion of much dispersion in size.

The sensor cover 361 and the magnet holder 362 of a blank being the magnetic material shield the external magnetic field, so that no fear exists that variations of the external magnetic field give influences to the magnetically sensitive sensor 333 and the magnet 364. Thus, the accurate measure is possible not being affected by variations of the external magnetic field.

The magnet 364 is positioned at the outer diametrical side of the magnetically sensitive sensor 363, and the outer diametrical side of the magnet 334 is supported by the magnet holder 362. Therefore, the present structure avoids breakage of the magnet 364 by strong centrifugal force generated when the shaft rotates at high speed.

Since the number of caulking positions is determined to be nZ±X (X≧2), it is possible to restrain occurrence of waviness of nZ or nZ±1 pieces in the raceway surface of the bearing owing to deformation by caulking. Therefore, it is possible to provide the sensor-rolling bearing 350 of high precision without issuing abnormal noises or vibrations.

The sensor-rolling bearing 350 of this embodiment may be applied as the bearing of the shaft used to automobiles, railway carriers, iron-making facilities, or tool machines for detecting rotation speed of shafts of various devices.

In addition, if the sensor cover 361 and the magnet holder 363 are respectively caulked to be fixed to the inner ring 351 and the outer ring 352, the same effect can be brought about.

TENTH EMBODIMENT

Figure 20:
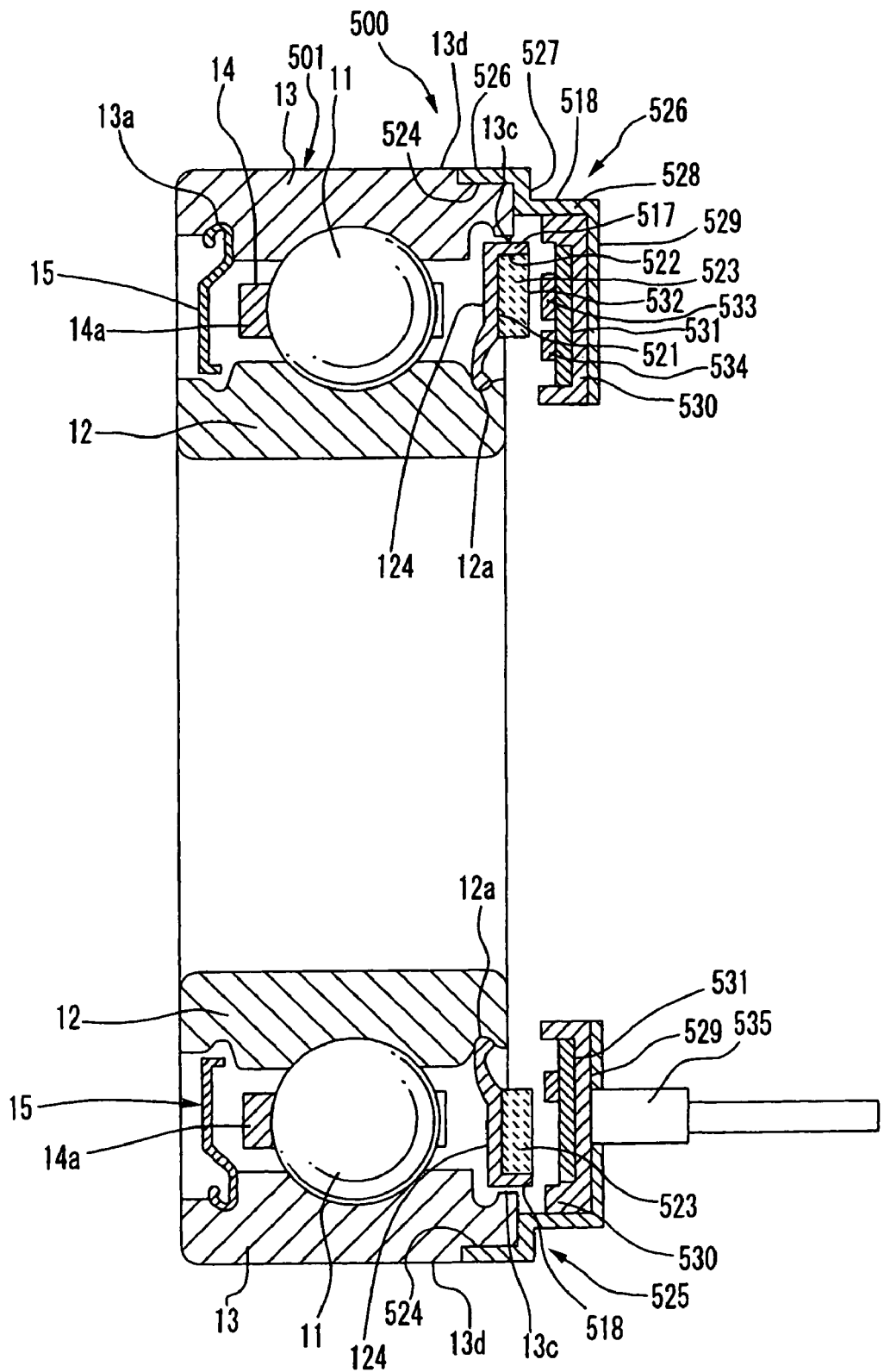
FIG. 20 is a cross sectional view showing the sensor-rolling bearing as a tenth embodiment of the invention.

The sensor-rolling bearing of the tenth embodiment according to the invention is shown in FIG. 20. The basic structure of the rolling bearing 501 of the sensor-rolling bearing 500 is the same as that of the fifth embodiment shown in FIG. 9 except parts to be mentioned under in detail, and the explanation will be omitted by giving the same numerals.

Referring to FIG. 20, the holder 14 is a plastic-made crown, and a ring shaped shielding plate 15 is secured to a side opposite to a ring portion 14a which is a closed side of the crown shaped holder 14, the plate 15 being mounted in the fitting groove 13a of the outer ring 13, and non-contacted to the inner ring 12.

The core metal 124 as the magnet attaching member forms a cylindrical part 517 bent in the axial direction of the bearing in the outer circumference, and the outer circumference 518 of the cylindrical part 517 is opposite to an inner circumferential end 13c of the outer ring 13, leaving a slight space. The multi-polar magnet 523 in ring and plane shape is disposed as contacting the side face 521 of the core metal 124 and the circumferential face 522 of the cylindrical part 517, and an adhesive is interposed at a part of contacting the multi-polar magnet 523 to the side face 521 and the circumferential face 522, so that the multi-polar magnet 523 is firmly secured to the core metal 124. The multi-polar magnet 523 has the magnetic poles as changing alternately in the circumferential direction.

On the other hand, the step portion 524 of a ring shaped groove formed at the end part of the outer circumferential face 13d of the outer ring is fixedly fitted with a fixing cylindrical part 526 of the sensor cover 525 of the magnetic substance, while a step 527 formed in the sensor cover 525 contacts the side face of the outer ring 13 for positioning.

The sensor cover 525 comprises a cylindrical holder 528 extending in the axial direction of the bearing and a cylindrical holder 529 extending from the front end of the cylindrical holder 528 toward the inside in the radius direction, and a resin made base plate holder 530 is disposed as contacting the cylindrical holder 528 and cylindrical holder 529, and the adhesive is interposed at their contacting part, so that the resin made base plate holder 530 is fixedly adhered to the sensor cover 525. As the resin of forming the base plate holder 530, for example, 66 nylon including glass fiber, 44 nylon or PPS may be used.

The circuit substrate 531 is fixed to the face opposite to the multi-polar magnet 523 in the base plate holder 530, and on the circuit substrate 531, the hole IC 533 is soldered via a decided space from the side 532 of the multi-polar magnet 523. In the shown embodiment, the circuit substrate 531 is appropriately soldered with various electric parts 534 such as a noise canceling resistor or a capacitor. In the same, the base plate holder 530 is extended at one part to make a cable taking-out portion 535. The cable taking-out portion 535 may be an independent body, but it is desirable to make one body as above mentioned, since the number of parts is less. If mounting the electric parts such as the noise canceling resistor or the capacitor on the circuit substrate 531, a sensor-bearing excellent in noise resistance may be realized.

The hole IC 533 soldered on the circuit substrate 531 is sufficient with a lead type, but a hole IC of a surface mounting type may be used, which is easy to solder and can attain a cost-down. Especially, in case of mounting on the circuit substrate 531 various electronic parts as the noise canceling resistor or the condenser other than the hole elements, if using the surface mounting typed resistor or condenser, all parts can be soldered by one process, and more desirably the production may reduce cost.

As the magnetically sensitive element, optional ones of the conventionally used magnet detecting elements such as hole elements, MR elements or MI elements other than the hole IC 533 may be selected and used.

In the above structure, since the outer circumferential face 518 of the cylindrical part 517 formed at the outer circumference of the core metal 124 faces the inner circumferential face 13c of the outer ring 13 with a slight space, is arranged to close the bearing space, and a grease in the bearing space is difficult to leak away outside. If the core metal 124 is made of the magnetic substance, the leakage magnetic flux passing the rolling elements can be checked from going to the multi-polar magnet 523 or the hole IC 533 owing to existence of the intensive magnetism occurring part in the outside. As a result, any miss-count of the speed pulse by an erroneous operation of the hole IC 533 is absent, enabling to heighten the pulse measuring precision. In addition, since the core metal 124 may be served as an interrupting member of the magnetic flux, other parts are unnecessary and the cost is reduced. If making the sensor cover 525 of the magnetic substance, an external magnetic flux can be interrupted by the sensor cover 525 of the magnetic substance. The magnetic flux of the multi-polar magnet 523 can be avoided from leaking outside.

With the structure of forming the cylindrical part 517 at the outer circumference of the core metal 124 and arranging the multi-polar magnet 523 inside of the cylindrical part 517, the positioning is preferably made easy when attaching the multi-polar magnet 523. If filling the adhesive in the space to support the outer circumference of the multi-polar magnet 523 with the cylindrical part 517, the multi-polar magnet 523 can be more preferably prevented from centrifugal breakdown.

As mentioned above, the multi-polar magnet 523 in plane shape is used, and the magnetically sensitive element such as the hole IC 533 is arranged, so that the thickness in the axial direction in the whole of the rolling bearing 501 can be reduced to be thin, and in particular the multi-polar magnet 523 can bear ranged at the part inherently providing the seal for protecting the inside of the rolling bearing 501, and since at least either of both plane sides of the multi-polar magnet 523 can be disposed inside than the end of the rolling bearing 501, the size in the axial direction of the whole of the rolling bearing 501 can be further shortened.

Incidentally, depending on shapes of the holder 14, the disposing position in the bearing axial direction of the multi-polar magnet 523 is determined, and as shown in FIG. 20, employing the crown shaped plastic holder, if disposing the sensor in a side of opening the crown of the holder, the size in the axial direction can be more preferably reduced.

The core metal 124 desirably employs the magnetic substance for performing magnetism interruption as mentioned later, an iron, martensite or ferrite based stainless steels are available. If using the iron as mentioned above, treatments as Zn or Ni plating or coating are desirable.

As the structure of fixing the core metal 124 to the inner ring 12, other than that the inner circumferential end of the core metal 124 is fitted in the fitting groove 12a defined in the inner circumferential face of the inner ring 12, it is sufficient that the inner ring 12 is made a flat face, not defining the groove, and a flange to be urged to the flat face is formed in the core metal 124, and is attached by forcing to press.

ELEVENTH EMBODIMENT

Figure 21:
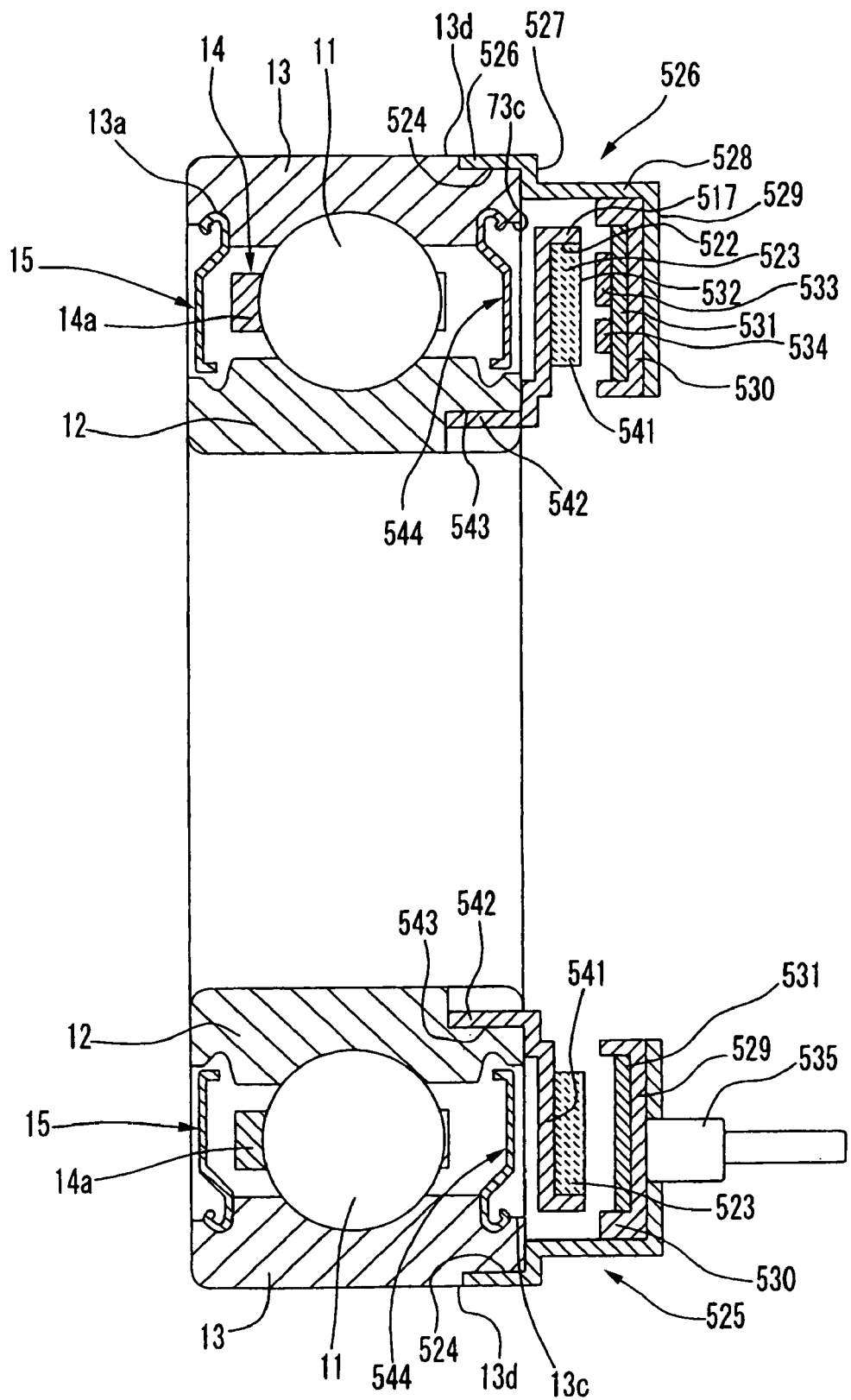
FIG. 21 is a cross sectional view showing the sensor-rolling bearing as an eleventh embodiment of the invention.

An eleventh embodiment of the invention is shown in FIG. 21. In the embodiment, a securing cylinder 542 of the core metal 541 as a magnet attaching member is fixedly fitted in the step portion 543 defined in the inner circumferential face of the inner ring 12. The same shielding plate 544 as the shielding plate 15 provided at the left side in the drawing of the rolling element 11 is also provided at the right side in the same of the rolling element 11. A point of arranging the hole IC 533 soldered to the circuit substrate 531 supported by the sensor cover 525 in such a manner that a determined space is formed in relation with the side face 532 of the multi-polar magnet 523 attached to the core metal 541, is the same as in the tenth embodiment, and a detailed explanation is omitted.

In the sensor-rolling bearing of the eleventh embodiment shown in FIG. 21, the core metal 541 is fixed to the inner circumferential face of the inner ring 12 as mentioned above, thereby to employ the structure of providing the shielding plates 15, 544 at the left and right of the rolling element 11, so that the conventionally used bearing cover (the bearing shield) can be used as it is, and the protection of the bearing inside can be exactly performed, and concurrently the grease filled in the interior can be checked from flowing outside.

TWELFTH EMBODIMENT

Figure 22:
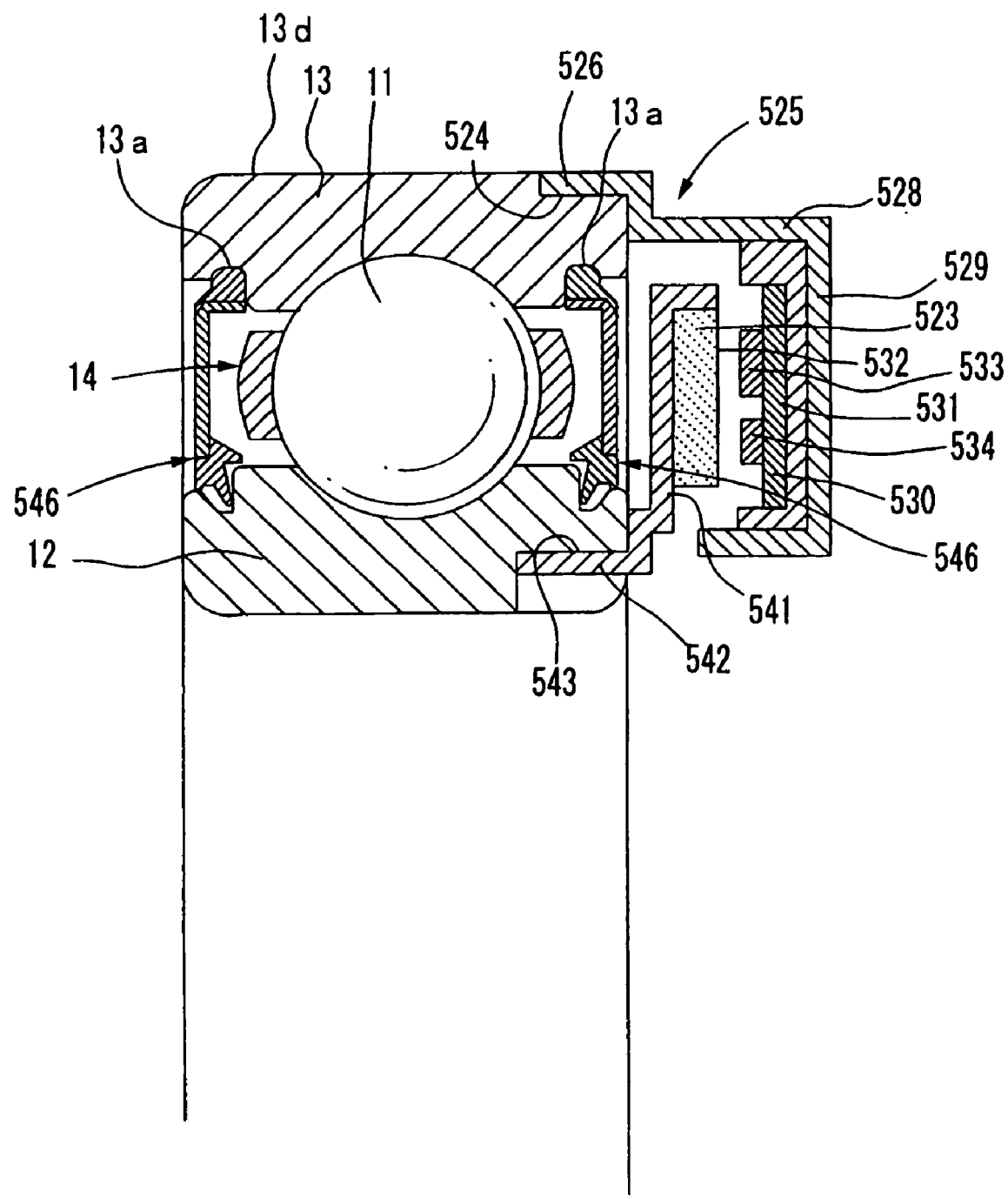
FIG. 22 is a partially cross sectional view showing the sensor-rolling bearing as a twelfth embodiment of the invention.

A twelfth embodiment is shown in FIG. 22. This embodiment uses a contacting rubber seal 546 as the bearing seal. The structures of the multi-polar magnet and the sensor are the same as in the eleventh embodiment shown in FIG. 21, and an explanation thereof is omitted.

In the sensor-rolling bearing of the twelfth embodiment shown in FIG. 22, similarly to the eleventh embodiment shown in FIG. 21, since the core metal 541 as the magnet attaching member is fixed to the step portion 543 formed in the inner circumferential face of the inner ring 12, the same sealing structure as that of the conventional bearing, whereby it is possible to employ the conventional sealing structure using a rubber seal 546 having a good sealing performance, and to provide the speed sensor, not largely projecting toward the side of the bearing.

In the sensor-rolling bearings of the eleventh and twelfth embodiments shown in FIGS. 21 and 22, the size in the axial direction of the rolling bearing is longer in comparison with that of the sensor-rolling bearing of the tenth embodiment shown in FIG. 20, but it can be shortened than the conventional one, and particularly, since the inherent seal of the rolling bearing can be served as it is, the sealing performance of the rolling bearing is not spoiled.

In the sensor-rolling bearings of the tenth to twelfth embodiments, the core metals 124, 541 as the magnet attaching member are arranged as closing the bearing space, and even if the bearing seal is absent there, the grease can be prevented from leakage. The magnetic flux leaking to the sides of the multi-polar magnet 523 or the hole IC 533 through the rolling elements 11 can be interrupted by these core metals 124, 541, and erroneous operations when detecting the speed pulse can be made naught.

As the core metals 124, 541, the magnetic substance is desirable for interrupting the magnetism, and then, the iron, martensite or ferrite based stainless steels are available.

If using the iron as mentioned above, rust preventing treatments as Zn or Ni plating or coating are desirable.

The eleventh and twelfth embodiments exemplify that the plane multi-polar magnet 523 is secured to the side of the inner ring 12 being the rotating ring, and in case the rotating ring is the outer ring 13, the multi-polar magnet 523 is attached to the outer ring 13 by the same technique as that of each embodiment using the core metal, so that the invention can be applied similarly as mentioned above.

The present invention has been explained in detail, referring to the specified embodiments, and it is apparent to those skilled in the art to add modifications or revisions, not deviating the spirit and scope of the invention.

The present application is based on the Japanese Patent Application filed Oct. 28, 2002 (No. 2002-312772), the Japanese Patent Application filed Dec. 13, 2002 (No. 2002-362635), the Japanese Patent Application filed Jan. 7, 2003 (No. 2003-001159), the Japanese Patent Application filed Jan. 10, 2003 (No. 2003-004493), and the Japanese Patent Application filed Aug. 27, 2003 (No. 2003-303736), and the contents thereof are taken herein as reference.

INDUSTRIAL APPLICABILITY

In accordance with the sensor-bearing apparatus and the sensor-rolling bearing of the present invention, reduction in size, high productivity and cost curtailing effect can be realized, the sensor can be positioned easily and a thigh precision, not requiring any complicated process as resin inserting formation, and further the leakage magnetic flux from the outside can be effectively bypassed, so that any erroneous operation of the sensor caused by electricity or magnetic noises of the motors can be prevented.

The invention claimed is:

1. A bearing apparatus with a sensor, furnished with a rolling bearing including in that a plurality of rolling elements are incorporated between a rotary-side bearing ring and a stationary-side bearing ring,
   a sensor enabling to detect conditions of the rolling bearing,
   a ring shaped sensor cover housing the sensor inward and secured to the stationary-side bearing ring, and
   a ring shaped presser member secured to a bearing housing or a shaft provided outside in a radius direction of the sensor cover,
   wherein an opening is defined in a determined position of the sensor cover, and is provided at its peripheral part with projections standing toward the side of the presser member,
   the presser member is formed with a cutout into which the projections are inserted for restraining rotation of the sensor cover.

2. The bearing apparatus with a sensor as set forth in claim 1, wherein a signal wire to be connected to the sensor is inserted in the opening.

3. The bearing apparatus with a sensor as set forth in claim 1, wherein the projections are made by being bent to project a slash formed in one part of the sensor cover in a diametrical direction.

* * * * *